(12) United States Patent
Lemons et al.

(10) Patent No.: US 11,333,792 B1
(45) Date of Patent: May 17, 2022

(54) SYSTEMS AND METHOD FOR ASSESSING SEISMIC RISK

(71) Applicant: SOURCEWATER, INC., Houston, TX (US)

(72) Inventors: Casee R. Lemons, Houston, TX (US); Jose E. Cortina, Houston, TX (US); Joshua Adler, Houston, TX (US)

(73) Assignee: SOURCEWATER, INC., Houston, TX (US)

( * ) Notice: Subject to any disclaimer, the term of this patent is extended or adjusted under 35 U.S.C. 154(b) by 0 days.

(21) Appl. No.: 17/384,098

(22) Filed: Jul. 23, 2021

Related U.S. Application Data

(60) Provisional application No. 63/189,959, filed on May 18, 2021.

(51) Int. Cl.
*G06N 5/04* (2006.01)
*G01V 99/00* (2009.01)

(52) U.S. Cl.
CPC ............. *G01V 99/005* (2013.01); *G06N 5/04* (2013.01)

(58) Field of Classification Search
CPC ............................... G01V 99/005; G06N 5/04
See application file for complete search history.

(56) References Cited

PUBLICATIONS

Sinha et al., Statistical Controls on Induced Seismicity, Jul. 23-25, 2018, Unconventional Resources Technology Conference, Houston, Texas, 13 pp. (Year: 2018).*

* cited by examiner

*Primary Examiner* — Toan M Le
(74) *Attorney, Agent, or Firm* — Medler Ferro Woodhouse & Mills

(57) ABSTRACT

Systems and methods for assessing seismic risk. The system and methods disclose deriving a model that is used to assess seismic risk of operations at a given location. A first location is identified for which at least one training seismic risk value is known from independent sources. A plurality of training input parameters associated with the first location is received. The at least one training seismic risk value is received. A process model is derived that relates the plurality of training input parameters to the at least one training seismic risk value by determining influence values of the training input parameters. A second location is identified for which a seismic risk is to be determined. A plurality of working input parameters associated with the second location is received. The process model is applied to the plurality of working input parameters to determine a seismic risk value at the second location.

30 Claims, 16 Drawing Sheets

SYSTEMS AND METHOD FOR ASSESSING SEISMIC RISK

RELATED APPLICATIONS

This application claims priority to U.S. Provisional Application No. 63/189,959, filed on May 18, 2021, which is incorporated herein by reference in its entirety. Additionally, this application is related to U.S. application Ser. No. 17/145,892 filed on Jan. 11, 2021, which is incorporated herein in its entirety.

TECHNICAL FIELD

The present disclosure generally relates to systems and methods for assessing seismic risk. In particular, the present disclosure relates to deriving a process model that can be used in determining the seismic risk associated with fluid disposal.

BACKGROUND

Knowledge of geology is the basis for many decisions within the Energy Infrastructure (EI) industry. For example, in oilfield exploration, geology drives decisions on where to drill and what extraction or production techniques to deploy for any given situation. Similarly, in example of mining, geology plays a key role in guiding excavations and production techniques to be deployed.

In oilfield exploration, with the extraction of oil and gas hydrocarbons, water is co-produced. The water is separated from oil and gas hydrocarbons and is a waste product, referred to as wastewater. When the wastewater is native reservoir water already combined with the hydrocarbons, the wastewater is commonly known as produced water. When the wastewater is a return of water injected into a hydraulic fracture completion, the wastewater is commonly known as flowback water, although in some situations, this type of wastewater may also be referred to as produced water.

Produced water and flowback water may be managed by injecting back into the subsurface (known as an injection of wastewater) or may be treated and then recycled or reused. Wells that inject water for permanent storage are called saltwater disposal (SWD) wells. Wells that inject gas for permanent storage are generically classified as gas storage wells. Wells that inject for temporary storage and stimulation of hydrocarbon production are called secondary, tertiary, or enhanced oil recovery wells (for the purposes of this description, secondary, tertiary, and enhanced oil recovery wells are referred to as secondary recovery (SR) wells).

Injection of wastewater into the subsurface is regulated at both federal and state levels by the Under-ground Injection Control (UIC) Program in the United States of America. The UIC Program was established in 1974, when Congress passed the Safe Drinking Water Act (SDWA), as the basis for regulating UIC wells and granted authority to the Environmental Protection Agency (EPA). The EPA groups injection wells into six classes based on the type of wastewater being injected. All injection wells related to oil and gas activity are under Class II wells, including SWD wells and SR wells. The EPA later awarded primacy, or authority to regulate Class II wells to many states under Section 1425 of the SDWA.

Class II UIC wells may either be drilled specifically for the purpose of SWD or may be an existing but depleted producing well that is repurposed for disposal of wastewater. Approximately 50% of SWD wells in the Permian basin were previously producing wells. In the case of disposal of wastewater, the wastewater is disposed into a formation (zone) with compatible lithology and pore space capable of holding water.

Gas storage wells are also part of the UIC program. Gas is injected into subsurface formations to maintain reservoir pressure or increase production by over-pressuring, most frequently in the form of carbon dioxide. Wells involving gas injection, including carbon dioxide gas (UIC Class VI, if carbon dioxide is injected for permanent storage), are included in the SR wells group. Carbon dioxide may also be injected into wells for the purpose of carbon sequestration.

Until 2019, the oil and gas industry denied that its industrial activity influenced seismic activity. However, it is now acknowledged that injection of wastewater into SWD wells can cause seismic events. Two primary causes that may cause seismic events are the disposal of wastewater and hydraulic fracturing. Hydraulic fracture may refer to a stimulation treatment routinely performed on oil and gas wells in low-permeability reservoirs. In some examples, specially engineered fluids are pumped at high pressure and rate into a reservoir interval to be treated, causing a vertical fracture to open. Wings of the fracture extend away from the wellbore in opposing directions according to the natural stresses within the formation. In some cases, proppant, such as grains of sand of a particular size, is mixed with the treatment fluid to keep the fracture open when the treatment is complete. Hydraulic fracturing may create high-conductivity communication with a large area of formation and bypasses any damage that may exist in the near-wellbore area. It may be challenging to pinpoint the exact source of a seismic event. Accordingly, the operators may have to be careful and should ensure that EI operations do not trigger seismic events.

SUMMARY

The present disclosure generally relates to systems and methods for assessing seismic risk associated with fluid disposal. In an example embodiment, a computer-implemented method of determining seismic risk associated with fluid disposal to be carried out by at least one processor configured to execute instructions, the method includes receiving a plurality of training input parameters associated with a first location, the training input parameters including at least one of true injection depth information, true formation information, permeability information, three-dimensional fault map information, fluid injection information, and seismic activity information, receiving at least one training seismic risk value associated with the first location, deriving a process model relating the plurality of training input parameters to the at least one training seismic risk value by determining influence values of the training input parameters, receiving a plurality of working input parameters associated with a second location, the working input parameters including at least one of true injection depth information, true formation information, permeability information, three-dimensional fault map information, fluid injection information, and seismic activity information, and applying the process model to the plurality of working input parameters to determine a seismic risk value at the second location.

In some implementations, the training input parameters further include at least one of geologic formation information at the first location, geologic hazard information at the first location, wellbore operations information at the first location, well architecture parameters at the first location, and completion parameters at the first location.

In some implementations, wherein the working input parameters include the true injection depth information, the method further includes generating a time-depth profile of activity within a wellbore at the second location, and determining the true injection depth information according to the time-depth profile of activity of the wellbore at the second location.

In some implementations, generating the time-depth profile of activity is based on wellbore perforation data, wellbore plug data, wellbore permit data, and wellbore injection data.

In some implementations, the true injection depth information is further determined according to a plurality of time-depth profiles of activity at a plurality of locations.

In some implementations, the plurality of locations is selected according to a distance from the second location.

In some implementations, the working input parameters include the true formation information, the method further includes generating a structural stratigraphic model at the second location, and determining the true formation information of a wellbore based on the structural stratigraphic model and the true injection depth.

In some implementations, the true formation information includes a cumulative measure of fluid injected into a geologic formation associated with the true formation information.

In some implementations, the working input parameters include the permeability information, the method further includes determining the permeability information based on at least one of classification based on lithology, derivation based on rock samples, and estimation based on a model of contour intervals.

In some implementations, the working input parameters include the three-dimensional fault map information, the method further includes generating at least one three-dimensional fault line map by digitizing fault research data, and associating a formation, a depth, a strike, a dip, and a length with at least one fault described in the fault research data.

In some implementations, the working input parameters include the fluid injection information, the fluid injection information including measurements over time of fluid volumes and fluid pressures of injected fluid and removed fluid corresponding to specific true injection depths and specific true formations.

In some implementations, the fluid injection information is obtained from sensors located on or within a wellbore.

In some implementations, fluid injection information is obtained from regulatory filings.

In some implementations, working input parameters include the seismic activity information, the method further includes obtaining seismic activity information from at least one of a sensor network and an earthquake catalog.

In some implementations, the seismic risk value includes at least one of a geologic formation seismic risk score, a geologic hazard seismic risk score, and a wellbore operational seismic risk score.

In some implementations, the method includes generating at least one of the working input parameters by providing a numerical score to a qualitative parameter.

In some implementations, deriving the process model further includes comparing the influence values to a threshold, and eliminating influence values not exceeding the threshold.

In some implementations, the method further includes receiving a plurality of modified working input parameters based on user input, the modified working input parameters being representative of a proposed water disposal action, applying the process model to the plurality of modified working input parameters to obtain a second seismic risk value, and causing display of a comparison between the seismic risk value and the second seismic risk value, the comparison being indicative of a seismic risk change associated with the proposed water disposal action.

In some implementations, the computer-implemented method further includes determining a plurality of seismic risk changes associated with a plurality of respective proposed water disposal actions, and identifying a lowest-risk water disposal action from among the plurality of respective proposed water disposal actions.

In some implementations, the plurality of respective proposed water disposal actions are selected according to a distance of available saltwater disposal wells from a produced water origin.

In some implementations, the computer-implemented method further includes causing display of a comparison between the seismic risk value and a pre-determined threshold seismic risk value, wherein the pre-determined threshold seismic risk value is determined according to a regulatory threshold.

In some implementations, the computer-implemented method further includes receiving location information associated with at least one water transportation vehicle, determining a disposal location used by the at least one water transportation vehicle, and designating the disposal location as the second location.

In some implementations, the computer-implemented method further includes receiving water disposal location information from at least one water disposal contractor, and determining the second location according to the water disposal location information.

In some implementations, the plurality of working input parameters are associated with a first time, the computer-implemented method further includes receiving a second plurality of working input parameters associated with a second time, applying the process model to the second plurality of working input parameters to determine a second seismic risk value, and comparing the seismic risk value and the second seismic risk value to identify a seismic risk trend.

In some implementations, the computer-implemented method further includes receiving a second plurality of working input parameters associated with a third location. The application of the process model includes applying the process model to the first plurality of working input parameters and the second plurality of working input parameters to determine a composite seismic risk value at the first location.

In some implementations, the computer-implemented method further includes identifying a formation capacity according to comparing the first seismic risk value and the second seismic risk value.

In some implementations, the deriving the process model includes performing a plurality of simulations on the training input parameters and the training seismic risk value.

In some implementations, the plurality of simulations are performed according to a Monte Carlo simulation or a machine learning simulation.

In some implementations, the computer-implemented method further includes identifying at least one working input parameter at the second location according to an occurrence of a seismic event.

In a further example embodiment, a system for determining seismic risk associated with fluid disposal is provided. The system includes at least one processor configured to execute instructions for: receiving a plurality of training input parameters associated with a first location, the training input parameters including at least one of true injection depth information, true formation information, permeability information, three-dimensional fault map information, fluid injection information, and seismic activity information; receiving at least one training seismic risk value associated with the first location; deriving a process model relating the plurality of training input parameters to the at least one training seismic risk value by determining influence values of the training input parameters; receiving a plurality of working input parameters associated with a second location, the working input parameters including at least one of true injection depth information, true formation information, permeability information, three-dimensional fault map information, fluid injection information, and seismic activity information; and applying the process model to the plurality of working input parameters to determine a seismic risk value at the second location.

In another example embodiment, a computer readable storage medium for determining seismic risk associated with fluid disposal is provided. The storage medium is configured to store a computer application for execution by at least one processor. The at least one processor is configured to execute instructions of the computer application for processing steps comprising: receiving a plurality of training input parameters associated with a first location, the training input parameters including at least one of true injection depth information, true formation information, permeability information, three-dimensional fault map information, fluid injection information, and seismic activity information; receiving at least one training seismic risk value associated with the first location; deriving a process model relating the plurality of training input parameters to the at least one training seismic risk value by determining influence values of the training input parameters; receiving a plurality of working input parameters associated with a second location, the working input parameters including at least one of true injection depth information, true formation information, permeability information, three-dimensional fault map information, fluid injection information, and seismic activity information; and applying the process model to the plurality of working input parameters to determine a seismic risk value at the second location.

Other aspects and advantages of the disclosure will become apparent from the following detailed description, taken in conjunction with the accompanying drawings, which illustrate by way of example, the principles of the disclosure.

DETAILED DESCRIPTION

Figure 1A:
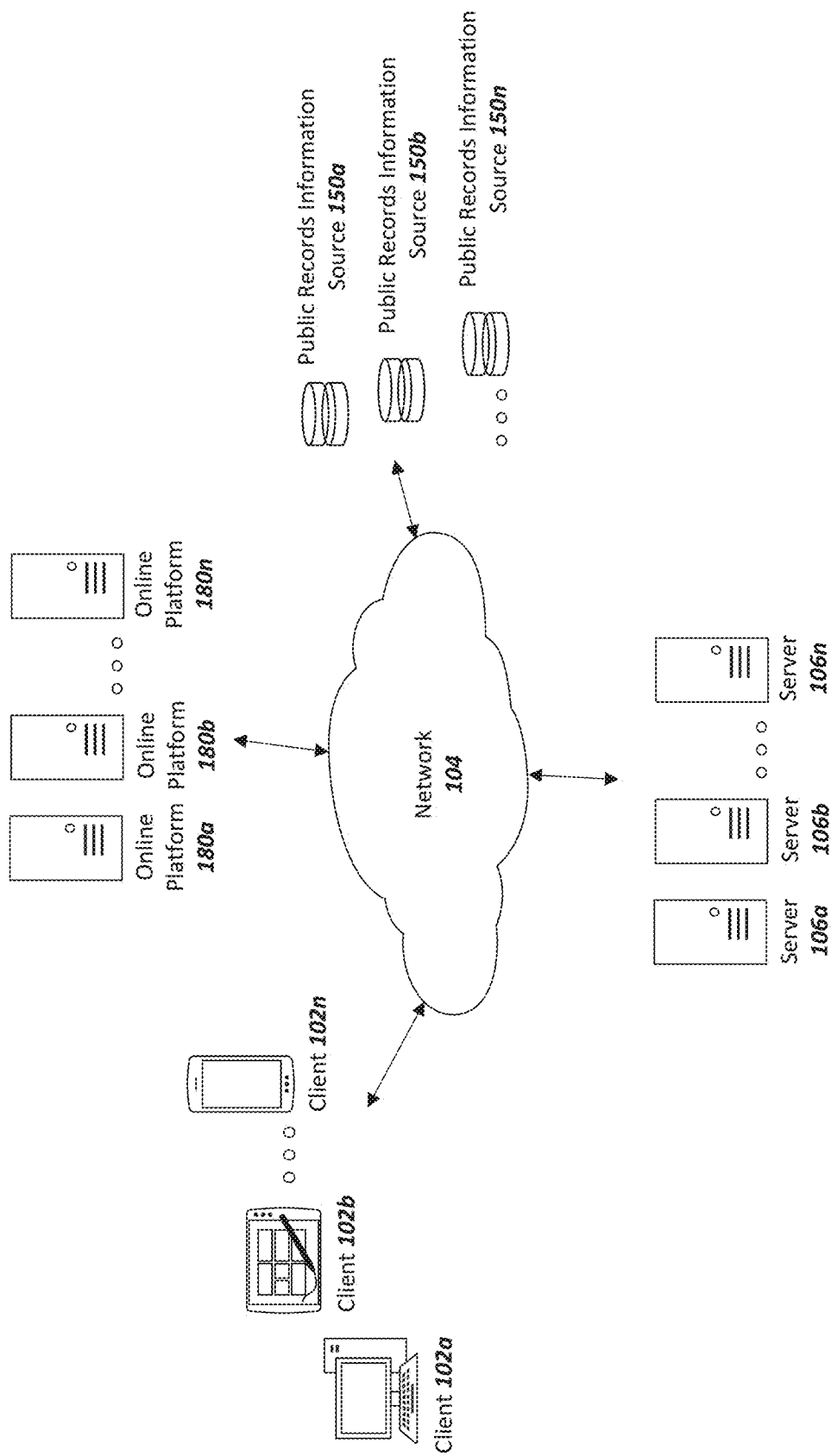
FIG. 1A is a block diagram depicting an embodiment of a network environment comprising client devices in communication with online platform devices, public records, information source devices, and server devices, according to some embodiments.

The following disclosure describes various embodiments that describe a system and method that can combine information from input parameters and assess seismic risk associated with hydraulic fracturing (also known as fracking) and/or disposal of fluid. The system and method describe deriving a process model that may be used to assess the seismic risk associated with the hydraulic fracturing, disposal of fluid, and/or such EI related activities at a given location. Fluids disposed of may include, for example, wastewater, and various gasses, e.g., carbon dioxide, commonly injected into wells. The process model relates a plurality of input parameters, scaled by their respective influence values, to one or more output parameters. The disclosure describes the usage of the process model in assessing the seismic risk for the given location and displaying the seismic risk to an operator or any other user.

The systems and methods described herein provide improvements to computer based modeling technologies, specifically as applied to seismic risk assessment. Current computer based modeling technologies are inadequate for achieving accurate seismic risk assessment results, for at least the reasons discussed herein. As discussed herein, process models are trained according to training input parameters and known or predetermined seismic risk values and then applied to working input parameters to obtain unknown seismic risk values at a new location. Process modeling techniques are improved in several ways to obtain optimal seismic risk results by technology discussed herein. For example, systems and methods discussed herein apply specific rules based algorithms to existing or obtained data related to disposal wells and geology to derive or obtain novel input parameters transformed from known data. In an example, as discussed below, true injection depth information is a novel input parameter determined according to a specific transformational rules based algorithm and representative of activity in a well-bore across time and depth. Similarly, true formation information, permeability information, three-dimensional fault map information, and fluid injection information represent novel input parameters determined and defined by transformational rules based algorithms to provide novel input parameters that optimize the creation and application of process models discussed herein. Other examples of such transformed novel input parameters generated to optimize the speed and accuracy of process models discussed herein are provided and discussed herein. In further examples, process model training and derivation, as discussed herein, is accomplished via a rules based process that applies specific weights to the novel input parameters derived herein. Accordingly, computer based modeling and simulation technologies are improved and optimized specifically to provide a solution to and address the above-discussed problems related to seismic risk assessment.

The methodologies discussed in this disclosure apply to Energy Infrastructure (EI) industries including petroleum and mining industries. The petroleum and mining industries involve exploration and exploitation of geologic resources. As a part of the exploration and exploitation of geologic resources, there may be input or output of materials from the Earth's subsurface. The input or output of materials, such as fluids (including liquids and gasses) from the subsurface may lead to a risk of subsurface movement or earthquakes (or collectively referred to as seismic risk). Determinations of seismic risk as discussed herein may be related to seismic risk associated with hydraulic fracturing (also known as fracking) and/or disposal and/or storage of fluid. Fluid disposal may include, for example, liquid (for example, wastewater) disposal as well as gas (for example, carbon dioxide) disposal. Although much of the following discussion specifically references Saltwater Disposal (SWD), it is understood that the methods and systems discussed herein may also be applied to seismic risk assessment for other types of fluid disposal and storage, such as, for example carbon sequestration. Carbon sequestration involves the injection and storage of carbon dioxide in disposal wells, tertiary recovery wells, depleted oil and gas wells, and/or custom designed wells specifically for carbon dioxide sequestration.

Understanding seismic risk associated with EI operations is crucial for all EI industries, including petroleum and mining industries, due to time and costs involved. For example, application for permit for a new production or Saltwater Disposal (SWD) well or mining may trigger a seismic review by a regulatory body such as the Texas Railroad Commission (RRC). The seismic review may increase the time taken to review the permit application and there is a possibility of the permit not being issued. As a result, an operator who has applied for the permit may be delayed in their operations. In another example, there is an environmental risk and liability involved due to wastewater disposal by an operator or a contractor hired by the operator. The impact on the operator may be significant in terms of cost due to the environmental risk and liability involved due to wastewater disposal. Therefore, it is important for the operators in the petroleum and mining industries to account for the seismic risk that may contribute to their eventual time and costs. To do so requires accurate and timely analysis of the locations for seismic risks for the EI operations.

The disclosure herein provides a technical solution to the aforementioned problems and describes systems and methods in which the derivation of the process model and its usage in an analysis of locations may help the operator to identify and choose location options with minimal risk of inducing a seismic event. For example, based on the analysis of the location using the process model, the operator may reduce volume and/or pressure of the injection of wastewater into a particular well, or the operator may modify the well through recompletion to inject into a different interval, avoiding a higher risk formation. In a case of the operator contracting out its wastewater disposal, the process model and its usage in analyses of locations may support the operator in determining where the water contractors may be disposing of wastewater. If there is a concern that a choice of SWD well the water contractors have chosen has high seismic risk, the operator can intervene and ensure that the contractors deliver the wastewater to an appropriate SWD well with acceptable seismic risk. Thus, the process model and its usage in an analysis of locations may support the operators in monitoring and minimizing environmental risk and liability.

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for deriving a process model that can be used in determining seismic risk associated with wastewater disposal or other fluid injection.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment may include one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106), one or more online platforms 180a-180n (also generally referred to as online platforms(s) 180, platform node(s) 180, platform machine(s) 180, or remote online platform machine(s) 180), one or more public records information source 150a-150n (also generally referred to as public records information source(s) 150, record node(s) 150, record machine(s) 150, or remote record machine(s) 150) via one or more networks 104. In some embodiments, one or more of client 102, online platform 180, or public records information source 150 has the capacity to function as both a node seeking access to resources provided by a server and as a server providing access to hosted resources for other clients 102a-102n, online platforms 180a-180n, and public records information sources 150a-150n. Examples of client(s) 102 includes user(s) 190 and subscriber(s) 195.

Although FIG. 1A shows a network 104 between clients 102, online platforms 180, public records information source 150, and the servers 106, in examples clients 102, online platforms 180, public records information source 150, and servers 106 may be on the same network 104. In some embodiments, there are multiple networks 104 between clients 102, online platforms 180, public records information source 150, and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks. Servers 106 may be used to generically refer to all online platforms 180, public records information source 150, and servers 106. Clients 102, online platforms 180, and public records information source 150 may process input from server 106 and/or may provide access as needed to various applications, modules, and other software components of server 106 to other various applications, modules, and other software components of server 106.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

In some embodiments, the system may include multiple, logically grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106, online platform 180, and public records information source 150, may be a file server, application server, web server, proxy server, appliance, network appliance, gateway, gateway server, virtualization server, deployment server, SSL VPN server, or firewall. In one embodiment, a plurality of servers 106, online platforms 180, and public records information sources 150 may be in the path between any two communicating servers 106, online platforms 180, or public records information sources 150.

Figure 1B:
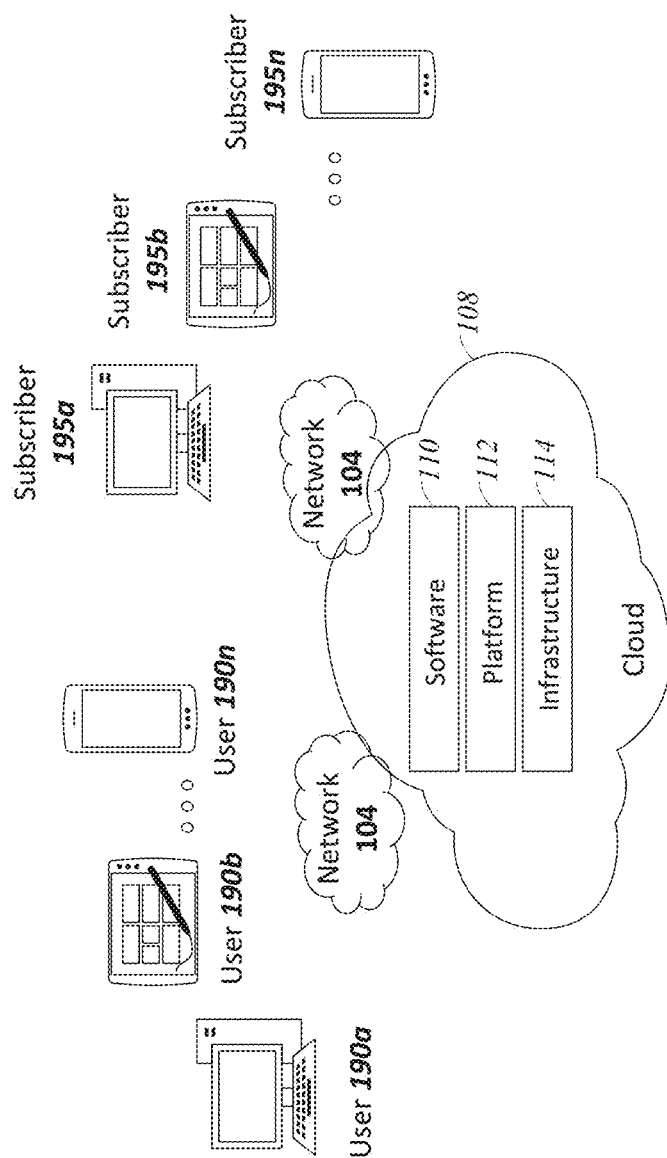
FIG. 1B is a block diagram depicting a cloud computing environment comprising client devices, for example user device and subscriber device, in communication with cloud service providers, according to some embodiments.

Referring to FIG. 1B, a cloud computing environment is depicted. A cloud computing environment may provide user 190 and subscriber 195 with one or more resources provided by a network environment. The cloud computing environment may include one or more users 190a-190n and one or more subscribers 195a-195n in communication with the cloud 108 over one or more networks 104. Users 190 and subscribers 195 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for user 190 or subscriber 195. The cloud 108 may include back end platforms, e.g., servers 106, storage, server farms or data centers.

The cloud 108 may be public, private, or hybrid. Public clouds may include public servers 106 that are maintained by third parties to client(s) 102, for example user(s) 190 and subscriber(s) 195 or owners of client(s) 102, user(s) 190, and/or subscriber(s) 195. The servers 106 may be located off-site in remote geographical locations as disclosed above or otherwise. Public clouds may be connected to the servers 106 over a public network. Private clouds may include private servers 106 that are physically maintained by client(s) 102, for example user(s) 190 and/or subscriber(s) 195 or owners of client(s) 102, user(s) 190, and/or subscriber(s) 195. Private clouds may be connected to the servers 106 over a private network 104. Hybrid clouds may include both private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g., Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Client(s) 102, for example user(s) 190 and/or subscriber(s) 195 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Client(s) 102, for example user(s) 190 and/or subscriber(s) 195 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client(s) 102, for example user(s) 190 and/or subscriber(s) 195 may access SaaS resources through the use of web-based user interfaces, provided by a web browser (e.g., Google Chrome, Microsoft Internet Explorer, or Mozilla Firefox provided by Mozilla Foundation of Mountain View, Calif.). Client(s) 102, for example user(s) 190 and/or subscriber(s) 195 may also access SaaS resources through smartphone or tablet applications, including e.g., Salesforce Sales Cloud, or Google Drive App. Client(s) 102, for example user(s) 190 and/or subscriber(s) 195 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client(s) 102, for example user(s) 190 and/or subscriber(s) 195 and server 106 may be deployed as and/or executed on any type and form of computing device, e.g., a computer, network device or appliance capable of communicating on any type and form of network and performing the operations described herein.

Figure 1C:
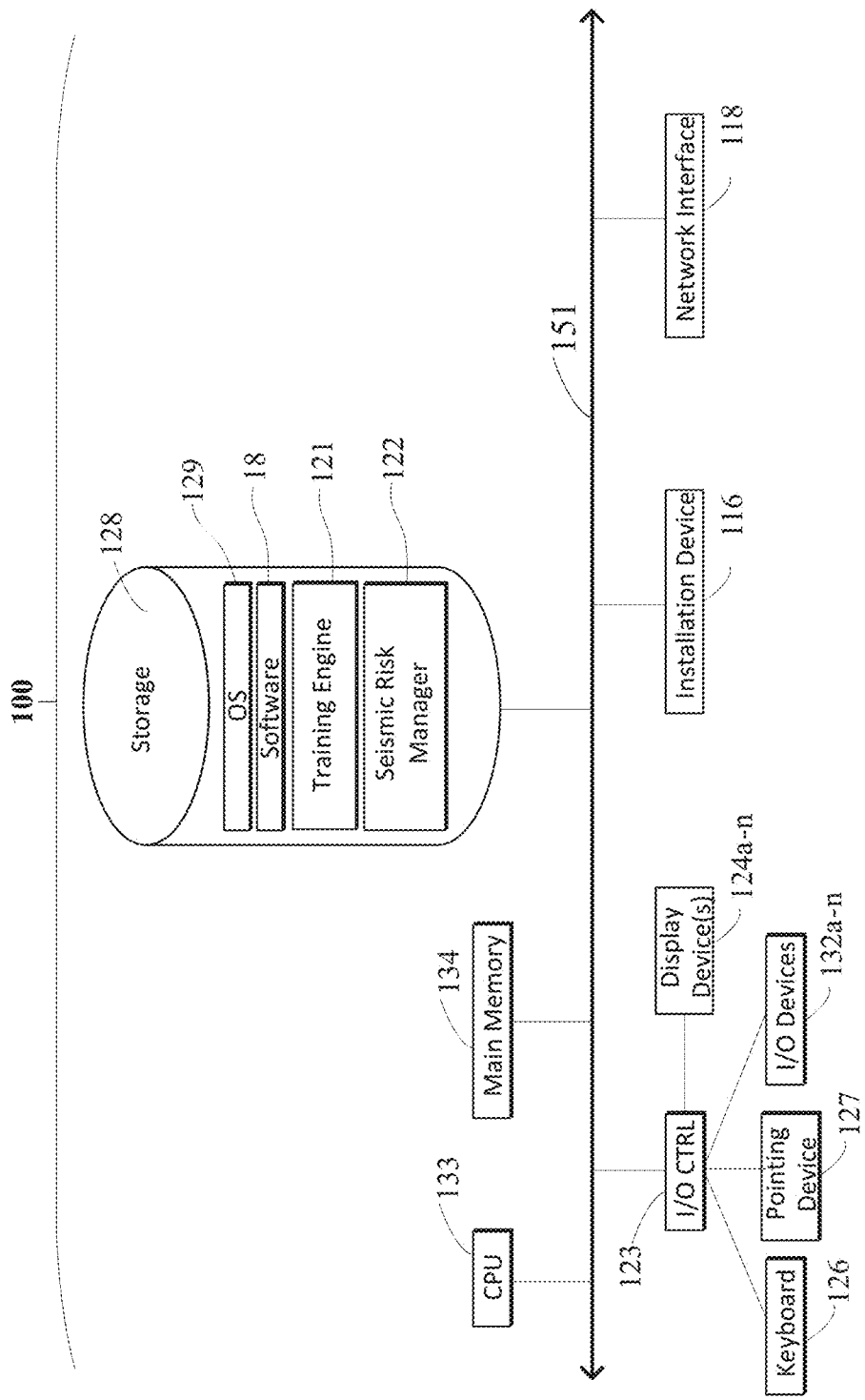
FIGS. 1C and 1D are block diagrams depicting embodiments of computing devices useful in connection with the methods and systems described herein.
Figure 1D:
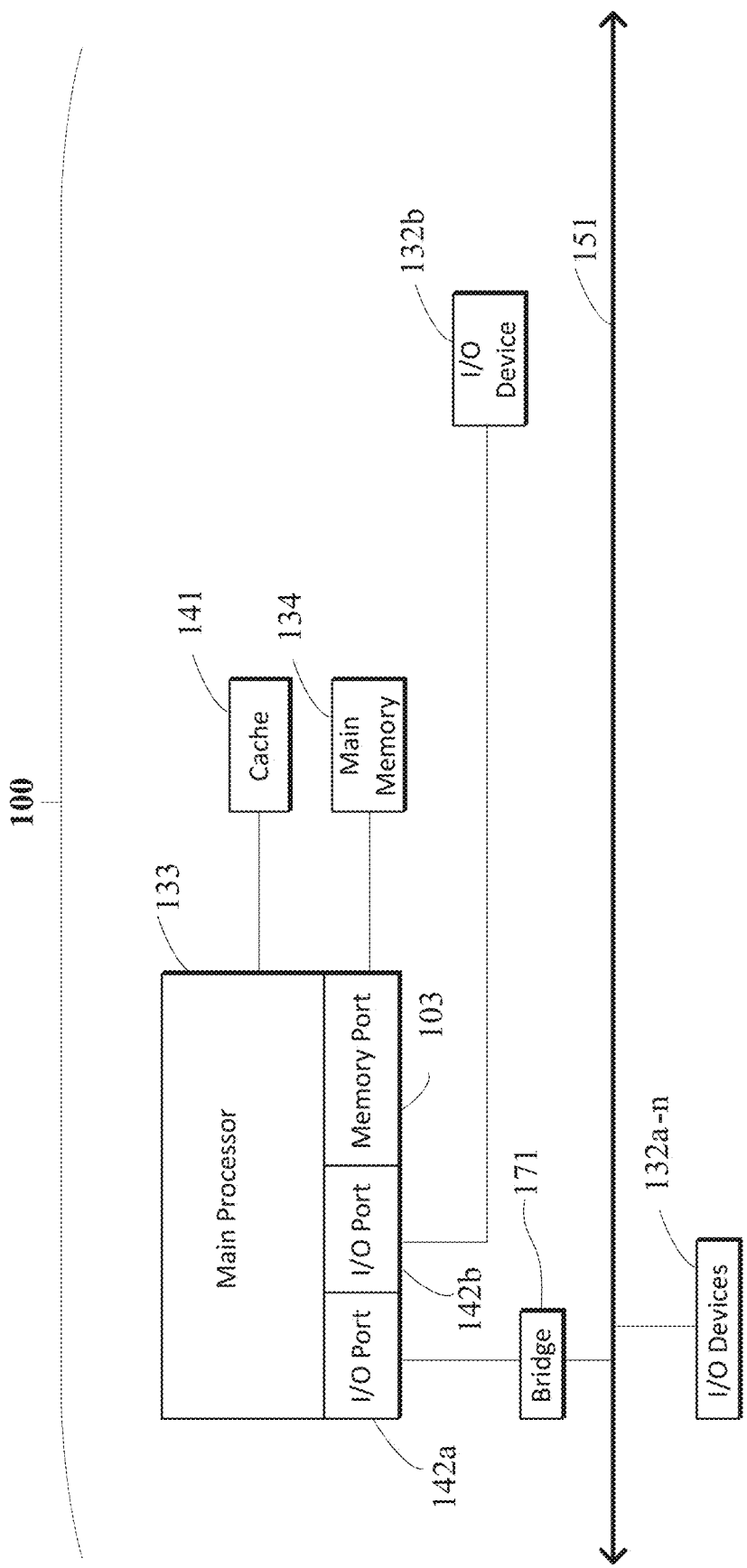

FIGS. 1C and 1D depict block diagrams of a computing device 100 useful for practicing an embodiment of the client 102, online platform 180, public records information source 150, and the server 106. As shown in FIGS. 1C and 1D, each computing device 100 includes a central processing unit 133, and a main memory unit 134. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, a software of training engine 121 and a software of seismic risk manager 122. As shown in FIG. 1D, each computing device 100 may also include additional optional elements, e.g., a memory port 103, a bridge 171, one or more input/output devices 132a-132n (generally referred to using reference numeral 132), and a cache memory 141 in communication with the central processing unit 133.

The central processing unit 133 is any logic circuitry that responds to and processes instructions fetched from the main memory unit 134. In many embodiments, the central processing unit 133 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER4 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 133 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i4.

Main memory unit 134 (a computer readable storage medium) may include on or more memory chips capable of storing data and allowing any storage location to be directly accessed by the microprocessor 133. Main memory unit 134 may be volatile and faster than storage 128 memory. Main memory units 134 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 134 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 134 may be based on any of the above described memory chips, or any other available memory chips capable of operating as described herein. In the embodiment shown in FIG. 1C, the processor 133 communicates with main memory 134 via a system bus 151 (described in more detail below). FIG. 1D depicts an embodiment of a computing device 100 in which the processor communicates directly with main memory 134 via a memory port 103. For example, in FIG. 1D the main memory 134 may be DRDRAM.

FIG. 1D depicts an embodiment in which the main processor 133 communicates directly with cache memory 141 via a secondary bus, sometimes referred to as a backside bus. In other embodiments, the main processor 133 communicates with cache memory 141 using the system bus 151. Cache memory 141 typically has a faster response time than main memory 134 and is typically provided by SRAM, BSRAM, or EDRAM. In the embodiment shown in FIG. 1D, the processor 133 communicates with various I/O devices 132 via a local system bus 151. Various buses may be used to connect the central processing unit 133 to any of the I/O devices 132, including a PCI bus, a PCI-X bus, or a PCI-Express bus, or a NuBus. For embodiments in which the I/O device is a video display 124, the processor 133 may use an Advanced Graphic Port (AGP) to communicate with the display 124 or the I/O controller 123 for the display 124. FIG. 1D depicts an embodiment of a computer 100 in which the main processor 133 communicates directly with I/O device 312b or other processors 133' via HYPERTRANSPORT, RAPIDIO, or INFINIBAND communications technology. FIG. 1D also depicts an embodiment in which local busses and direct communication are mixed: the processor 133 communicates with I/O device 132a using a local interconnect bus while communicating with I/O device 132b directly.

A wide variety of I/O devices 132a-132n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 132a-132n may include a combination of multiple input or output (I/O) devices, including, e.g., Microsoft KINECT, Nintendo Wiimote for the WII, Nintendo WII U GAMEPAD, or Apple iPhone. Some I/O devices 132a-132n allow gesture recognition inputs through combining some of the inputs and outputs. Some I/O devices 132a-132n provide for facial recognition which may be utilized as an input for different purposes including authentication and other commands. Some I/O devices 132a-132n provide for voice recognition and inputs, including, e.g., Microsoft KINECT, SIRI for iPhone by Apple, Google Now or Google Voice Search, and Alexa by Amazon.

Additional I/O devices 132a-132n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 132a-132n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, a I/O device 132 may be a bridge between the system bus 151 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (IMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 132a-132n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to seismic risk manager 122. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 151. Some storage device 128 may be external and connect to the computing device 100 via an I/O device 132 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 4, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 340 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M9A/AAC, WMA Protected AAC, AIFF, Audible audiobook, Apple Lossless audio file formats and .mov, .m4v, and .mp4 MPEG-4 (H.244/MPEG-4 AVC) video file formats.

In some embodiments, the computing device 100 is a tablet e.g., the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g., the KINDLE family of devices by Amazon.com, or NOOK family of devices by Barnes & Noble, Inc. of New York City, N.Y.

In some embodiments, client 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, client 102 is a laptop or desktop computer equipped with a web browser and a microphone and speaker system, e.g., a telephony headset. In these embodiments, the client(s) 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Assessing Seismic Risk

Figure 2:
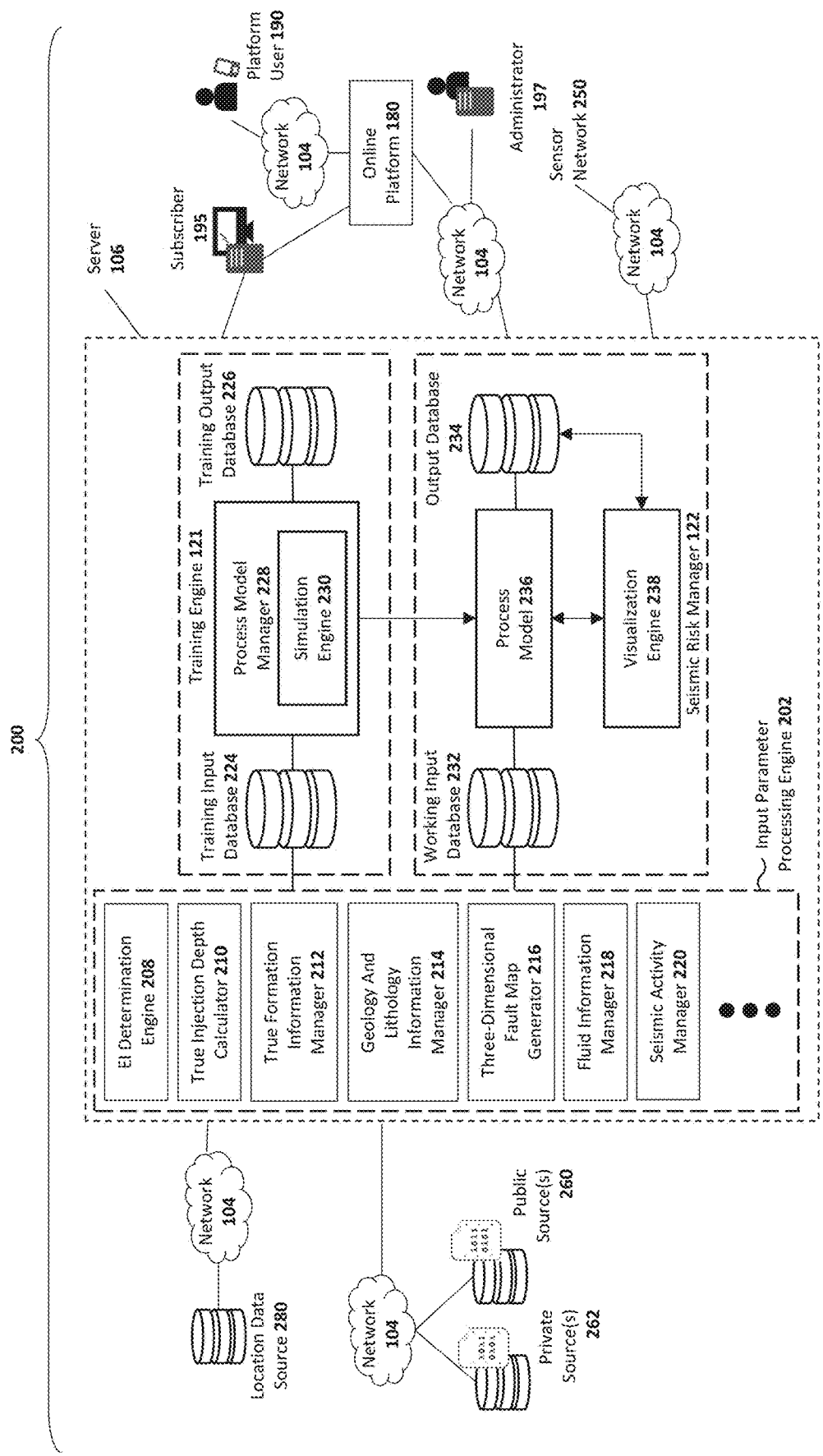
FIG. 2 shows a system configured for deriving a process model for determining seismic risk for a given location, according to some embodiments.

The following describes systems and methods that can combine information from sources and assess seismic risk associated with disposal of fluids (liquids and gasses), such as wastewater, carbon dioxide, and others. The systems and methods described herein, as discussed above, provide technical improvements to computer modeling and simulation technologies for increasing the speed and accuracy of seismic risk assessment. In a general overview, FIG. 2 shows a system 200 configured for generating a process model for determining seismic risk for a given location, according to some embodiments. System 200 may include server 106. Server 106 may include input parameters processing engine 202, training engine 121, and seismic risk manager 122 communicatively coupled to each other.

Input parameters processing engine 202 processes information from various information sources to derive input parameters. Input parameters processing engine 202 processes may run quality control on the input parameters and normalize the input parameters according to their known distributions and statistics based on a large data set (for example, statistical parameters). Input parameters processing engine 202 includes EI determination manager 208, true injection depth calculator 210, true formation information manager 212, geology and lithology information manager 214, three-dimensional fault map generator 216, fluid information manager 218, seismic activity manager 220, and such other input parameter modules.

EI determination manager 208 may identify EI locations including a SWD well, a wellbore, a drilling rig, and such EI information based on information obtained from public source(s) 260 and private source(s) 262. In some examples, EI determination manager 208 may process and obtain EI locations from public records such as government permits and water transfer records reported to and maintained by a regulatory body obtained from public source(s) 260. In some examples, EI determination manager 208 may also obtain EI location information from proprietary sources such as a location data source 280. In some examples, EI determination manager 208 may be configured to determine the EI locations. In one example, EI determination manager 208 may use satellite imagery-based EI determination to establish wellbore location at a given location. In some examples, EI determination manager 208 may be configured to determine a location of an SWD well by analysis of water transfer records reported to and maintained by a regulatory body. In an example analysis, a disposal lease may be traced from a destination well, via an organization responsible for the disposal lease, to an organization that produced the wastewater or other injected fluid. Using results of analysis, EI determination manager 208 may determine an EI location by identifying wastewater disposal (or other fluid injection) operations of a specific operator. In some examples, location data source 280 may have information such as map locations, physical addresses, aerial images associated with maps, such as those obtained from satellite or aerial devices, and such EI location-related information. EI determination manager 208 may perform EI location and/or status processing by using known techniques or proprietary techniques and may involve artificial intelligence (AI). In some examples, EI determination manager 208 may correlate information from public source(s) 260, private source(s) 262, and location data source 280 to determine the EI location.

True injection depth calculator 210 may determine true injection depth information at a wellbore. The true injection depth information may represent depths at which there is an activity in the wellbore as against depth information obtained from a permit for the activity. The true injection depth information may be a special case of a true depth. A true depth (also referred to as active depth in the petroleum industry) is defined as a shallowest and deepest measurable depth within a wellbore that an operator has perforated and is producing from or injecting water into during a given time period. The true depth may include true top which is a shallowest measured depth, and true bottom which is a deepest measured depth. To determine a true injection depth, true injection depth calculator 210 may obtain and process permits obtained from public source(s) 260 to determine a permitted injection depth for the wellbore. Using the processed permits, true injection depth calculator 210 may generate a time-depth profile of activity within the wellbore. To generate the time-depth profile of activity within the given wellbore, true injection depth calculator 210 may obtain and process, for example, state-mandated forms associated with the permit from the public source(s) 260 that is used for standard reporting for the Underground Injection Control (UIC) program. Some examples of state-mandated forms in the states of Texas and New Mexico that may provide information that may be used for generating the time-depth profile include, but are not limited to:

- (TX) Form H-10 (having an annual declaration of the minimum and maximum depth, volume, and pressure of injection at a monthly interval);
- (TX) Drilling Permit and Associated Forms (W-1, W-1 Field Addendum, W-1D, W-1H, P-12) (having information on wellbore location and architecture);
- (TX) Inactive Well Forms (W-3C, W-3X) (having information on periods of inactivity);
- (TX) Injection/Disposal and Water Quality Forms (GT-5, H-1, H-1A, H-1S, H-10, P-13, W-14) (having information on permitted minimum and maximum depths for injection);
- (TX) Well Completion and Associated Forms (G-1, P-12, W-2, W-4, W-5, W-12, W-15) (having information on wellbore architecture and completions);
- (TX) Well Plugging Forms (W-3A, W-3, W-15) (having information on perforations which are inactive (plugged/closed) and at what date they became inactive);
- (NM) Application for Permit to Drill, Re-enter, Deepen, Plugback or Add a Zone (C-101) (having information on wellbore location, architecture, and perforations that are inactive (plugged/closed) and at what date they became inactive);
- (NM) Sundry Notices and Reports on Well (C-103) (having information on wellbore architecture and completions);
- (NM) C-103 Specifically for Subsequent Report of Well Plugging (C-103) (having information on perforations information which are inactive (plugged/closed) and at what date they became inactive);
- (NM) Well Completion or Recompletion Report and Log Updated (C-105) (having information on current and historical changes in wellbore architecture and completions); and
- (NM) Application for Authorization to Inject (C-108) (having information on permitted minimum and maximum depths for injection).

The abovementioned forms may include files having information such as wellbore injection permits, wellbore drilling permits, wellbore architecture, wellbore completions, wellbore plugging, and any other wellbore modification. The information may include data in different forms and units. True injection depth calculator 210 may process one or more of the abovementioned forms using text recognition techniques and identify and obtain data. True injection depth calculator 210 may process obtained data by processing each data type individually, subjecting the data to unit conversions, quality control, and normalization as appropriate to generate a UIC and drilling dataset. As part of a process of quality control of input data from sources, true injection depth calculator 210 may extract permit top and permit bottom depths from the UIC and drilling datasets. Permit top may refer to a top depth of a zone within a wellbore that an operator is permitted to create a perforation, or hydraulically fracture within. In some examples, true injection depth calculator 210 may determine and discard any record that appears erroneous. For example, true injection depth calculator 210 may consider all records with a minimum permitted depth (referred to as the permit top) recorded as a higher value than a maximum permitted depth (referred to as the permit bottom) as erroneous records and may remove such records. In another example, true injection depth calculator 210 may consider and discard any records of wells without a recorded permit top and permit bottom from the UIC and drilling dataset. In some examples, true injection depth calculator 210 may consider a range of depth in terms of a permit top and permit bottom allowed by individual regions. For example, in United States, permits are not provided for perforations shallower than 1 ft and deeper than 28,000 ft. Thus, true injection depth calculator 210 may consider any record less than 1 ft and greater than 28,000 ft as erroneous and may discard such records. In some examples, true injection depth calculator 210 may consider limits of a given region based on analysis of records of the given region. For example, analysis of data associated with Midland Basin of Texas shows that permits do not exist at depths greater than 14,000 ft. Based on the analysis, true injection depth calculator 210 may consider any records indicating permits within the Midland Basin greater than 14,000 ft, as erroneous and may discard such records. In one example, true injection depth calculator 210 may use an example filtering process to extract valid data after a regional analysis is performed:

"SELECT well,permit bottom,permit top FROM permit records WHERE (permit top>1) AND (permit bottom≤14000) AND (permit top<permit bottom) AND well is located inside the Midland Basin"

The permit top and the permit bottom are MD of the respective variable. MD may refer to a length of a wellbore as if determined by a measuring stick. The MD may differ from the true vertical depth of the wellbore in all but vertical wells. MD may represent a measured depth. Permit records may be a database of permitted depths, measured in MD, typically provided by a regulating government agency. The Midland Basin may be an example geo-region with its boundaries defined by a georeferenced polygon. In the example, wells with surface hole locations (for example, expressed in coordinate form (x, y)) within the georeferenced polygon may be included in results, and wells with surface hole locations outside the georeferenced polygon may be excluded. To further the example in the Midland Basin, it has been determined through an analysis of available data that a ratio of permitted injection bottom depth to permitted injection top depths is valid up to a value of 3.0. Based on the ratio, true injection depth calculator 210 may consider all data points relating to the Midland Basin in which the ratio of the bottom to top depth is greater than 3.0 as erroneous and discards such records and data from the UIC and drilling dataset.

True injection depth calculator 210 may compile the aforementioned data associated with permitted wells and their architectures into plug, perforations, and permit relationships to form a wellbore-based dataset of all usages and alterations occurring over time. A plug may be referred to as a closure of a perforated interval to prevent oil and gas reservoir fluids from migrating uphole over time and possibly contaminating other formations and/or freshwater aquifers. A well may be plugged by setting mechanical blocks or cement in the wellbore at specific depth intervals. A perforation may refer to a communication tunnel created from a casing or a liner into a reservoir formation through which oil or gas is produced. The files may include data on a permit top, permit bottom, start date, end date, start depth, and end depth. True injection depth calculator 210 may collate data such as date of each plug, perforation, and permit, and may couple these with a depth. As a result of the collation of the data, true injection depth calculator 210 may determine and generate a representation of a wellbore changing over time, from the surface to the wellbore base. A perforation may be considered an opening and is open until the date it is closed with a plug or cement. A plug may be considered a closure and is closed permanently unless reopened later. A permit may be considered a boundary and, if an injection is permitted within a depth and time range, perforations and plugs outside that range are considered inapplicable due to injection practice. In one example, if production is permitted within a depth and time range, perforations and plugs outside that range may be considered inapplicable due to production practice. Example of relationships between input parameters which may be created and used by true injection depth calculator 210 include: date ranges of production and injection for every wellbore, a combination of all perforations, plugs, permits, and dates from surface to a deepest point within a wellbore, range of dates within which injection at any given depth is actively occurring, and consolidation of contiguous depths of a wellbore that have a common start date and end date to determine the minimum and maximum depth of each continuous range.

True injection depth calculator 210 may use an example process to identify and achieve relationships between data. In one example, the process may include:

extracting wellbore plug, perforation, permit history, and dates of injection and production from public source(s) 160 and private source(s) 162;

combining all wellbore plugs, perforations, and permit histories into a single table; and grouping the combined data by wellbore (all data items sharing a single surface hole location) and order by depth and date.

A further example of data quality control that true injection depth calculator 210 may use is to ensure that any perforation (opening) and plug (closing) at a matched depth interval should be within a time period (including a predetermined buffer period on either side) identified on a permit to ensure that the classification of the perforation or plug is correctly made. In an example, there may be multiple permits associated with an opening and closing of a wellbore over a period of time for production, secondary recovery, and disposal.

An example is shown in Table 1. The table is sorted by date and then by top depth. The top and bottom depths are for the event in a reference under "event type." All units are measured depths (MD) in feet. Table 1 is also expressed as a time-and-depth-based image 500 in FIG. 5.

TABLE 1

Events associated with a well

| Well ID | Event Type | Event Date | Event Top Depth (MD ft) | Event Bottom Depth (MD ft) |
|---|---|---|---|---|
| Well A | Production permit | (unknown) | N/A | N/A |
| Well A | Perforation | 1961 Sep. 06 | 9050 | 9190 |
| Well A | Perforation | 1961 Sep. 06 | 9230 | 9330 |
| Well A | Production begin | 1961 Oct. 12 | N/A | N/A |
| Well A | Production end | 1966 Nov. 30 | N/A | N/A |
| Well A | Injection permit | 1967 Sep. 27 | 8990 | 9330 |
| Well A | Injection begin | 1968 Jan. 03 | N/A | N/A |
| Well A | Perforation | 1984 Jan. 12 | 8980 | 9050 |
| Well A | Plug | 1984 Jan. 12 | 9230 | 9330 |
| Well A | Injection end | 1994 Jun. 10 | N/A | N/A |

Figure 5:
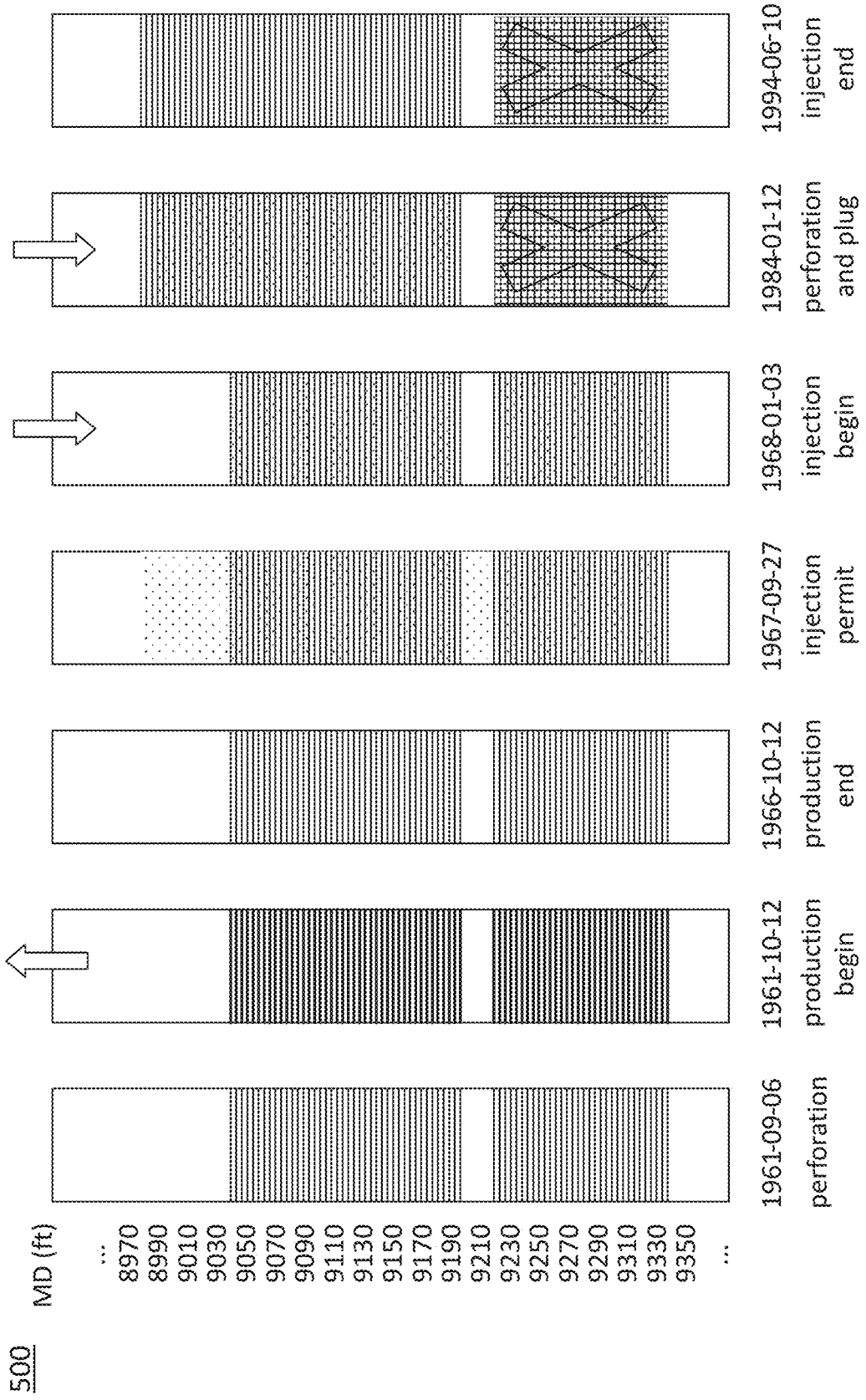
FIG. 5 illustrates a time-and-depth image of a well, according to some embodiments.

According to the example provided in Table 1 and FIG. 5, true injection depth calculator 210 may infer at least based on dates provided as described below.

1. Year less than or equal to 1961:
    a. The production permit date and depths are unknown. The production permit was probably issued before the perforations occurred. Because the shallowest perforation for production is 9050 ft, the deepest perforation for production is 9330 ft, and production occurred from these perforated intervals, the production permit depths are probably from 9050 ft to 9330 ft, or some similar depth range.
2. Year 1961:
    a. Production begins. Hydrocarbon production can only occur from the perforated intervals, 9050 ft to 9190 ft and 9230 ft to 9330 ft.
3. Year 1966
    a. Production ends.
4. Year 1967
    a. The well was applied for an SWD well permit (referred as an injection permit in the table and diagram). The depths permitted for injection are more extensive than the perforations, with the shallowest permitted depth being 8990 ft and the deepest permitted depth being 9330 ft.
    b. An application for disposal is permitted into the same depths as former hydrocarbon production if the applicant can prove the disposal will not interfere with production; in contrast, an application for SR is approved if the operator can prove that injection will enhance production.
5. Year 1968
    a. Injection begins. Because no other perforations occurred before injection began, the only possible depths at which fluid can be injected into the wellbore are those perforated depths that already existed and were drilled in 1961. The MD at which injection occurs is 9050 ft to 9190 ft and 9230 ft to 9330 ft.

6. Year 1984
   a. The bottom set of perforations is plugged. This set is no longer active. The injection will no longer occur from 9230 ft to 9330 ft.
   b. A new, shallower set of perforations is added. The shallower perforation is from 8980 ft to 9050 ft. Note that the shallowest perforation depth (8980 ft) is shallower than the permitted top (8990 ft). In an example, perforated intervals that overlap in time and are within a pre-determined tolerance value shallower than the permit top or deeper than the permit bottom may be included in the record. In some examples, the pre-determined tolerance value is 10 ft.
   c. Injection to now occur from 8980 ft to 9190 ft.
7. Year 1994
   a. Injection ends, and the well becomes inactive.

Referring back to true injection depth calculator 210, in an example, true injection depth calculator 210 may obtain processed data from the UIC and drilling data set such as wellbore perforation data, wellbore plug data, wellbore permit data, wellbore injection data and related data. True injection depth calculator 210 may use the processed data to generate the time-depth profile of activity within the wellbore. The time-depth profile may describe perforations in the wellbore in terms of use (for example, production, injection, no activity) and time of use. True injection depth calculator 210 may determine the true injection depth information according to the time-depth profile of activity of the wellbore. True injection depth calculator 210 may also ingest the processed data into training input database 224 and/or working input database 232. The true injection depth is an important input parameter and may serve as an input in determining 3-D alignment of fault lines, reservoirs, and fluid injection.

True formation information manager 212 may determine a true formation of a given wellbore. True formation may refer to a geologic formation that an operator has perforated and is producing from or disposing into via the given wellbore. In one embodiment, true formation information manager 212 may use a structural stratigraphic model to determine the true formation in the given area of interest. The structural stratigraphic model may refer to a model representing a geologic subsurface of a given area of interest. The structural stratigraphic model may include a relative order and sequence of strata, along with their three-dimensional distribution with respect to historical deformation. In some examples, the structural stratigraphic model may be visually represented with a structural stratigraphic chart, also called a structural stratigraphic column, in which thickness is represented on a y-axis. A structural stratigraphic model of subsurface zones may include formation locations, depths, thicknesses, and lithologies and it may be developed in any area. The structural stratigraphic model may identify all formations in use by the oil and gas or mining industries and contain, at a minimum, a relative sequence of formations present at a reference point in space and the lithology of those formations. In some examples, where the structural stratigraphic model is used, true formation information manager 212 may obtain a sample of the structural stratigraphic model taken based on true injection depth in the wellbore. In some examples, where a structural stratigraphic model is not available, true formation information manager 212 may use a sequence stratigraphic model. A sequence stratigraphic model may refer to a model representing the geologic subsurface. The sequence stratigraphic model includes a relative order and sequence of strata, along with the age of the strata during deposition and diagenesis. In some examples, the sequence stratigraphic model may be visually represented with a sequence stratigraphic chart, also called a sequence stratigraphic column, in which age may be represented on, for example, y-axis. In some examples, true formation information manager 212 may determine the true formation by converting a true depth into a True Vertical Depth (TVD), intersecting the TVD with a local structural stratigraphic model, and identifying the geologic formation(s) that occur at the TVD. TVD may be referred to as a vertical distance from a point in the well (that may be a current or final depth) to a geographic point at the surface and a reference elevation. Derivation of true formations of injection may enables injection volumes and pressures to be attributed to a correct formation with the formation's known geologic properties. In an example, derivation of the true formation may lead to knowledge of depth of occurrence, thickness, presence of underlying and overlying seals, permeability, porosity, lithology, and other attributes of the true formation.

Figure 6:
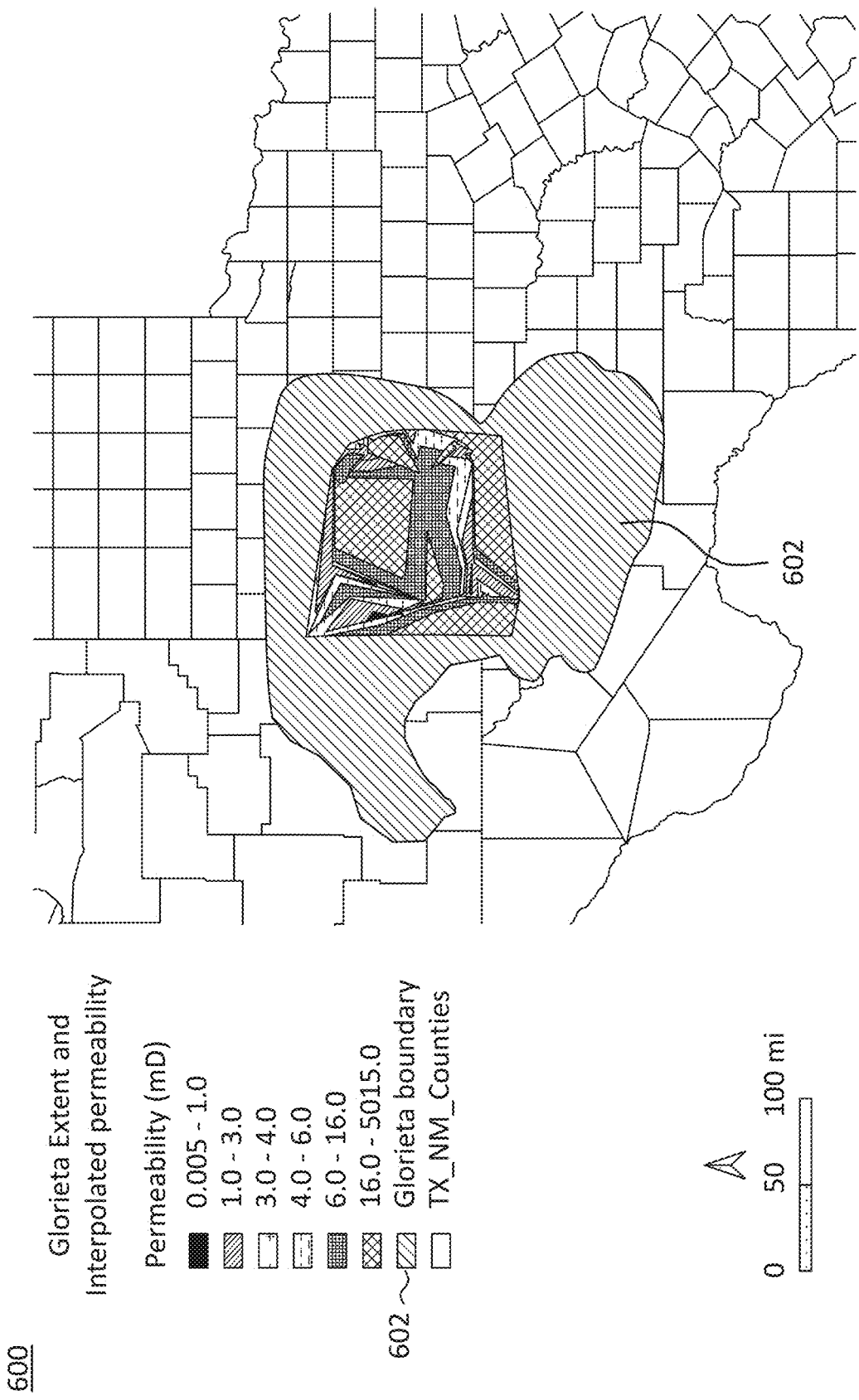
FIG. 6 illustrates an example of a model of contour intervals changing across height and space of a formation, according to some embodiments.

Geology and lithology information manager 214 obtains and processes geology and/or lithology information including a permeability information and a porosity information from public source(s) 260, private source(s) 262 and/or from information such as true formation determined by true formation information manager 212. Permeability is a measure of the ability of fluid to flow through a rock, and porosity is a measure of the space within a rock. In some examples, geology and lithology information manager 214 may obtain the permeability information and the porosity information from measurements performed in a laboratory using pristine rock pieces extracted and preserved while drilling. In some examples, geology and lithology information manager 214 may determine the permeability and porosity by classifying rocks as qualitatively high permeable, medium-high permeable, medium permeable, medium-low permeable or low permeable based on lithology information of a given area. In some examples, geology and lithology information manager 214 may determine permeability and porosity by quantitatively estimating by generating a complex model of contour intervals changing across the height and space of the formation. An example of the quantitative estimation is described in FIG. 6 that illustrates a permeability contour map 600, which is a visual representation of a technique of interpolating permeability by interpreting the likely value across space. FIG. 6 illustrates an example of a model of contour intervals changing across the height and space of a formation. FIG. 6 shows a Glorieta boundary 602 in an index as well as on a permeability contour map 600. The interpolated area is illustrated from 0.005 to 5015.0 mD in various ranges including 0.005-1.0 mD, 1.0-3.0 mD, 3.0-4.0 mD, 4.0-6.0 mD, 6.0-16.0 mD, and 16.0-5015.0 mD. FIG. 6 illustrates application of the interpolation only to some parts of the Glorieta.

Referring back to FIG. 2, three-dimensional fault map generator 216 may generate a three-dimensional fault line map based on one or more faults for a given area. A fault may be referred to as a planar or gently curved fracture within the rocks of Earth's crust, in which compressional, tensional, and/or shearing forces cause relative displacement between opposite sides of the fracture. The fault may be a hazard having a seismic risk associated with it. In some examples, three-dimensional fault map generator 216 obtains and processes data on faults from sources to generate a three-dimensional map. Examples of the sources of the fault data include public source(s) 260 such as the Texas Bureau of Economic Geology, Center for Integrated Seismicity Research, USGS, published and peer-reviewed journals, and private source(s) 262 such as a dataset derived by Sourcewater by digitization and data processing from available sources such as TexNet. In some examples, three-dimensional fault map generator 216 may obtain digitized descriptions of fault research data that are available from peer-reviewed journals. In some examples, three-dimensional fault map generator 216 may obtain the fault research data from the sources of data on faults, may digitize the fault research data, and may place the fault data in training input database 224 and/or working input database 232. In one example, digitizing the fault research data may include processing research data by recognizing relevant text, tagging the recognized text with relevant keywords, standardizing any values or measurements in the data, and storing the data in appropriate forms. Three-dimensional fault map generator 216 may process the digitized fault research data to determine an association of a formation, a depth, a strike, a dip, and a length (collectively referred to as fault attributes) with each fault. In some examples, three-dimensional fault map generator 216 may use machine learning and/or artificial intelligence techniques for processing the digitized fault research data. The formation may refer to a body of rock that is sufficiently distinctive and continuous that it can be mapped. For example, in an oilfield, hydrocarbon-bearing formations are explored for and drilled into for the purpose of extracting oil and natural gas. The strike may refer to an orientation of a plane of a fault line as it intersects a surface of the Earth. The dip may refer to an incline of a fault measured perpendicular to strike. Three-dimensional fault map generator 216 may interpret the digitized fault research data by interpolating the information on fault lines with the surfaces of the formation (in all axes) thereby accounting for the age of the formation at the time of formation of the fault and how the subsurface has changed in the time since the fault line formed. Using the interpretation, three-dimensional fault map generator 216 generates the three-dimensional fault line map. In some examples, the locations of fault lines are further enhanced by reference to a structural stratigraphic model of subsurface zones that may allow the intersection of the fault line with a formation to be determined.

Fluid information manager 218 may process and manage fluid injection information for a given wellbore. The fluid injection information includes measurements over time of fluid volumes and fluid pressures of injected fluid and removed fluid corresponding to specific true injection depths and specific true formations. In some examples, fluid information manager 218 may obtain the fluid injection information from sensors located on or within a wellbore and/or regulatory filings available from public source(s) 260, and/or private source(s) 262. The fluid injection information may form an input parameter since a geological formation may have a limited capacity for material. Whether the geological formation is close to that capacity and under strain due to fluid injection may have a bearing on seismic risk. Examples of the data types associated with the fluid injection information that may be used are well header, well architecture, perforation interval depths, treatment and stimulation, injection and production volumes, formations along the well path, and disposal formations of some oil and gas districts. Fluid information manager 218 may extract, process, and evaluate data associated with the fluid injection information for the volume and pressure of fluid and/or solid materials moving in and out of a location and depth. Fluid information manager 218 may differentiate volumes and pressures into time and geographic space, and assigned to formations that act as source or destination. In some examples, fluid information manager 218 may perform quality assurance on the data. In an example, fluid information manager 218 may carry out an automated process on the data which identifies outliers based on an analysis of data trends over an entire set of data. Once outliers are identified, fluid information manager 218 may replace the outliers by an average value of the replaced parameter over a predetermined period, thereby improving the statistical robustness of the data. In an example, the automated process may identify outliers in time and/or space.

In further embodiments, specifically with respect to gas injection, such as carbon dioxide injection for carbon sequestration purposes, the fluid information manager 218 may obtain fluid injection information related to unintended leaks and/or emissions from a well. Such information may be obtained, for example, via spectral monitoring by satellites, and/or by other monitoring methods. Fluid injection information related to leaks and/or emissions may be used, for example, to verify that an injected gas remains in a well (e.g., carbon dioxide remains sequestered) and/or to update an overall understanding of injected fluid and removed fluid.

Seismic activity manager 220 may manage and process seismic activity information of various locations. In one example, seismic activity manager 220 may obtain the magnitude and location of seismic activity from a continuous feed from public earthquake catalogs. In some examples, seismic activity manager 220 may derive seismic activity information from sensor networks 250. Some examples of sensor networks include, but are not limited to TexNet, USGS and other such sensor networks. In some examples, hypocenter depth of an earthquake may be correlated with a structural stratigraphic model to identify a formation that is the source of the seismic activity.

Input parameters processing engine 202 may include other input parameter processing modules not shown herein. Each of EI determination manager 208, true injection depth calculator 210, true formation information manager 212, geology and lithology information manager 214, three-dimensional fault map generator 216, fluid information manager 218, seismic activity manager 220, and other input parameter modules may perform data ingestion into training input database 224, and working input database 232. Input parameters processing engine 202 may process data associated with each of input parameters obtained from EI determination manager 208, true injection depth calculator 210, true formation information manager 212, geology and lithology information manager 214, three-dimensional fault map generator 216, fluid information manager 218, seismic activity manager 220 and other input parameter modules into training input database 224 and/or working input database 232 with a common schema. During the data preparation phase, input parameters processing engine 202 may assign a quantitative value to data that may not be processed by a numerical algorithm. Input parameters processing engine 202 may statistically analyze the data, which is linearly or logarithmically distributed, determine its statistical measures (e.g., mean, standard deviation), and may normalize the data during the data preparation stage.

In some examples, input parameters processing engine 202 may run quality control on the training input parameters and normalize the training input parameters according to their known distributions and statistics based on a large data set. The normalized statistical parameters may be referred to as the data model for the input parameter. All data which form the training input parameters may be normalized prior to usage in deriving process model. In an example, for the training input parameter having linear quantitative values, input parameters processing engine 202 may scale the value between a minimum and a maximum value such that the scaled maximum value would equal 1.0. In another example, for the training input parameter having linear quantitative values, input parameters processing engine 202 may take a difference between the minimum value and maximum value and divide the difference into 100 steps. In some examples, input parameters processing engine 202 may normalize the training input parameter value by placing the training input parameter value at a corresponding step between the minimum value and the maximum value. In some examples, the training input parameter value may determine a data model for a training input parameter from a large data set and may apply the data model to normalize the input parameter. In an example, the data model may be a statistical distribution and standard measures (for example, mean and standard deviation) for the input parameter.

In instances where the input parameter is qualitative, input parameters processing engine 202 may categorize the values as a high category, a medium-high category, a medium category, a medium-low category, and a low category. In some examples, the aforesaid categories may be assigned quantitative values or weights. For example, input parameters processing engine 202 may assign the high category a value of 90, the medium-high category a value of 70, the medium category a value of 50, the medium-low category a value of 30, and the low category a value of 10. In some examples, input parameters processing engine 202 may assign the training input parameter a rank from 1 to n to indicate worst to best by a measure. The measure may vary with a type of input source and the measure may be different for the same input depending on the input parameter that is being assessed. For example, when considering a disposal opportunity, then input parameters processing engine 202 may rank limestone as "best" and sandstone as "worst". In an example, for a seismic risk value, input parameters processing engine 202 may rank the sandstone as "best" because the sandstone is least risky, and the limestone as "worst" because the limestone is most risky. In some examples, this assignment may be carried out by an expert. The expert may be a specialist in a particular field of technology. For example, a scientist specialized in seismology or study of earthquakes or a or seismologist may be considered for the assignment. In another example, a geologist may be considered for the assignment.

In instances where the input parameter value is a non-linear quantitative value, input parameters processing engine 202 may group the training input parameter values according to an average effect. In some examples, input parameters processing engine 202 may categorize the value of the groups as high, medium-high, medium, medium-low, and low. In some examples, the assignment of the average effect and the grouping of the average effects may be carried out by an expert. Specifically, where the value represents magnitude of earthquakes, an example groups the data according to average earthquake effects. In some examples, the Modified Mercalli Intensity Scale (MMIS) may be used to determine and describe average earthquake effects. In some examples, input parameters processing engine 202 may use the full range of the scale, and in other examples, input parameters processing engine 202 may limit the upper range of the scale based on knowledge of local data. For example, a global grouping has a maximum earthquake effect value of >M9.0, but magnitudes of earthquake that high are not seen in the US. The maximum earthquake effect value experienced in the US is M6.5, and the maximum earthquake effect value experienced in, for example, the Midland Basin is M3.7. In some examples, input parameters processing engine 202 may normalize data based on a true maximum value and in some examples, data may be normalized based on a local maximum value. In an example, input parameters processing engine 202 may combine bands of average earthquake effects and labeled as a high band, a medium-high band, a medium band, a medium-low band, and a low band. For example, in the Midland Basin, input parameters processing engine 202 may define ≥M3.5 as a high band, a range of M2.9 to M3.49 as a medium-high band, a range of M2.3 to M2.89 as a medium band, a range of M1.7 to M2.29 as a medium-low band, and ≤M1.69 as a low band. For other locations, input parameters processing engine 202 may define the bands differently considering the average earthquake effects. In some examples, input parameters processing engine 202 may assign quantitative values for the bands of average earthquake effects: the high band, the medium-high band, the medium band, the medium-low band, and the low band. For example, input parameters processing engine 202 may represent the high band by a value of 90, the medium-high band by a value of 70, the medium band by a value of 50, the medium-low band by a value of 30, and the low band by a value of 10. Other examples not described here are contemplated herein Training engine 121 may enable generation of a process model through process model manager 228 by providing training input parameters and training output parameters. Training engine 121 may include training input database 224, training output database 226 and process model manager 228. Training input database 224 may be a repository that receives and stores a plurality of training input parameters from input parameters processing engine 202. The plurality of training input parameters are input parameters associated with a given location that are provided to process model manager 228 for correlation with known seismic risk values for a given location. Training output database 226 may include known seismic risk values for locations obtained from independent sources such as public source(s) 260 and private source(s) 262. A seismic risk value is a value that represents an assessment of seismic risk. A seismic risk may indicate a potential for a wellbore or mine at a given geographic location and geologic formation to induce or be impacted by seismic events. The seismic event may represent an event that generates seismic waves in the subsurface. A seismic risk value may include at least one of a geologic formation seismic risk score, a geologic hazard seismic risk score, and a wellbore operational seismic risk score.

Process model manager 228 derives process model 236 by relating the plurality of training input parameters associated with a control location to the at least one training seismic risk value at the control location by determining influence values of the training input parameters. The control location may refer to a location in which all input parameters are known alongside an independent assessment of a seismic risk value. Influence value may refer to a scalar value that reflects a contribution (or "influence") that an input parameter has in a calculation of a seismic risk value. Process model manager 228 may include simulation engine 230 to perform a plurality of simulations on the training input parameters and the training seismic risk value. In one example, simulation engine 230 may perform a Monte Carlo simulation on the process model multiple times with the data from the control location. Monte Carlo simulation also known as a multiple probability simulation, is a mathematical technique/method, which is used to estimate the possible outcomes of an uncertain event in a process that cannot easily be predicted due to the intervention of random variables. During each iteration, simulation engine 230 may adjust the input parameters according to their individual data model to simulate a statistical distribution that would have been present when data for each input parameter was measured. Based on the multiple, statistically-varying outputs from the Monte Carlo simulation, process model manager 228 may determine the respective influence values that best relate the input training parameters to the seismic risk values. In another example, process model manager 228 may apply a machine-learning algorithm to a series of known data sets to derive the influence value of each input parameter. Other examples to derive the influence value of each input parameter not described here are contemplated herein.

Seismic risk manager 122 may apply process model 236 on a plurality of working input parameters from working input database 232 to generate output parameters that include a seismic risk value. Seismic risk manager 122 includes working input database 232, output database 234, process model 236, and visualization engine 238. Working input database 232 may receive and store a plurality of working input parameters from input parameters processing engine 202. The plurality of working input parameters are input parameters associated with a given location that are provided to process model 236 to determine a seismic risk value for the given location. Output database 234 may store output parameters that include seismic risk values calculated by process model 236 for locations that are chosen by users. Process model 236 outputs an assessment of seismic risk by providing seismic risk values based on the working input parameters for a given location. Although FIG. 2 illustrates training input database 224 and working input database 232 as separate databases, training input database 224 and working input database 232 may be implemented as a single input database or multiple input databases. Similarly, although FIG. 2 illustrates training output database 226 and output database 234 as separate databases, training output database 226 and output database 234 may be implemented as a single input database or multiple input databases.

Visualization engine 238 displays the output parameters that includes a seismic risk value generated by process model 236. In some examples, visualization engine 238 may display the seismic risk value on a chart through a display tool. In some examples, visualization engine 238 may display the seismic risk value alongside other information such as working input parameters along with their influence values. In some examples, visualization engine 238 may provide interpretations of the seismic risk value such as for example, high risk, medium-high risk, medium risk, medium-low risk, or low risk in association with threshold values input into the display tool. In some examples, visualization engine 238 may indicate whether a permit to operate may be granted for the seismic risk value in accordance with a regulatory threshold. In some examples, visualization engine 238 may display a comparison between the seismic risk value and a pre-determined threshold seismic risk value (which may be a regulatory threshold or user set threshold). In some examples, visualization engine 238 may display the seismic risk value as components (such as geologic formation seismic risk score, geologic hazard seismic risk score, and wellbore operational seismic risk score) that make up the seismic risk value. Other visualization examples not disclosed here are contemplated herein.

Server 106 may be controlled, configured, or administered by administrator 197, who may be connected to server 106 directly or via network 104. Administrator 197 may be authorized to access or control server 106 either directly or via network 104. System 200 may be configured such that operations that may be performed by administrator 197 may include for example, the updating of software or firmware used by any component of the server, the configuring, receiving or processing of diagnostic reports or logs, the configuring of parameters, variables, or thresholds used by any component of the server, the reading or writing of data from any storage within server 106, or the performing of direct communication or communication via network 104 with system components external to server 106.

System 200 may also include online platform 180 that serves as an interface between server 106 and subscriber 195 and/or platform user 190. Subscriber 195 may occasionally use online platform 180 and may rely on subscription services provided by online platform 180 such as regular updates on changing seismic risk at a location of interest based on EI activities. Platform user 190 may use online platform 180 actively to perform analysis and analytics for one or more locations to determine seismic risks. Services provided by server 106 may be availed by subscriber 195. Subscriber 195 may, for example, be an individual or an organization, that subscribe to seismic risk manager 122 in order to receive analytics or insights, or may subscribe to online platform 180 in order to receive seismic risk values from online platform 180 obtained through seismic risk manager 122 or analytics generated by online platform 180. Subscriber 195, platform user 190, operator, owner, contractor, business and/or government entities using server 200 through online platform 180 may be collectively referred to as a user henceforth. Online platform 180 may have access to server 106 comprising seismic risk manager 122 that provides details of seismic risk values. Online platform 180 may provide a front-end user interface for subscriber 195 and/or platform user 190 to access and use seismic risk manager 122. Subscriber 195 and/or platform user 190 may access seismic risk manager 122 through online platform 180 to input location information and to analyze seismic risks. Online platform 180 may provide a display tool interface that is coupled with visualization engine 238 to control and manipulate input and provide output.

The purpose of seismic risk manager 122 may be to provide insights, for example, to subscribers 195, about seismic risks at EI locations such as wellbore locations or SWD locations, which in turn may help an operator to save time and costs in terms of applying for a permit with government agencies by analyzing the seismic risk at a SWD location and making appropriate changes in plan to reduce seismic risk, optimally plan for injection at the wellbore, identify, and choose location options with minimal risk of inducing a seismic event and minimize environmental risk and liability.

Figure 3:
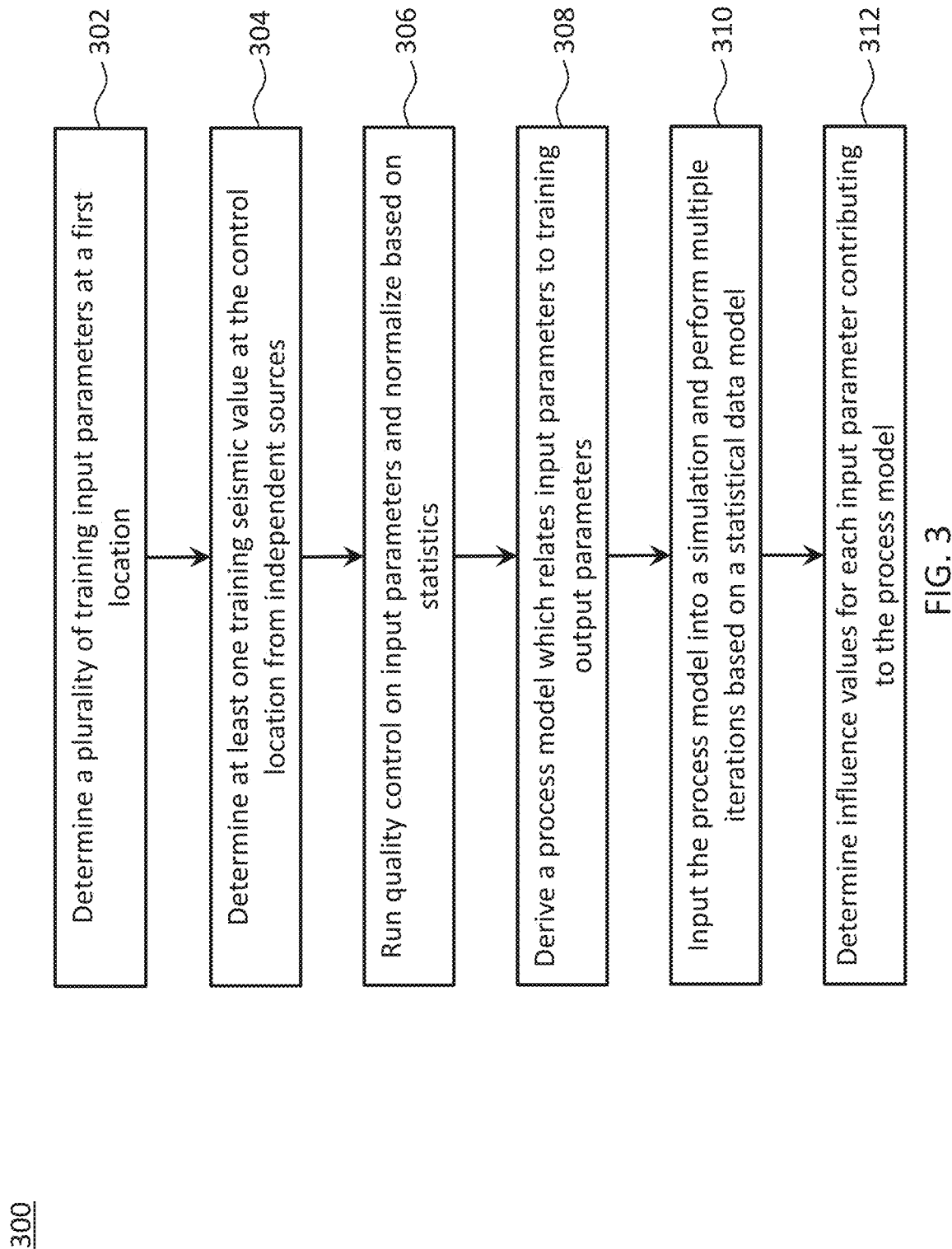
FIG. 3 illustrates a process flow for deriving the process model, according to some embodiments.
Figure 4:
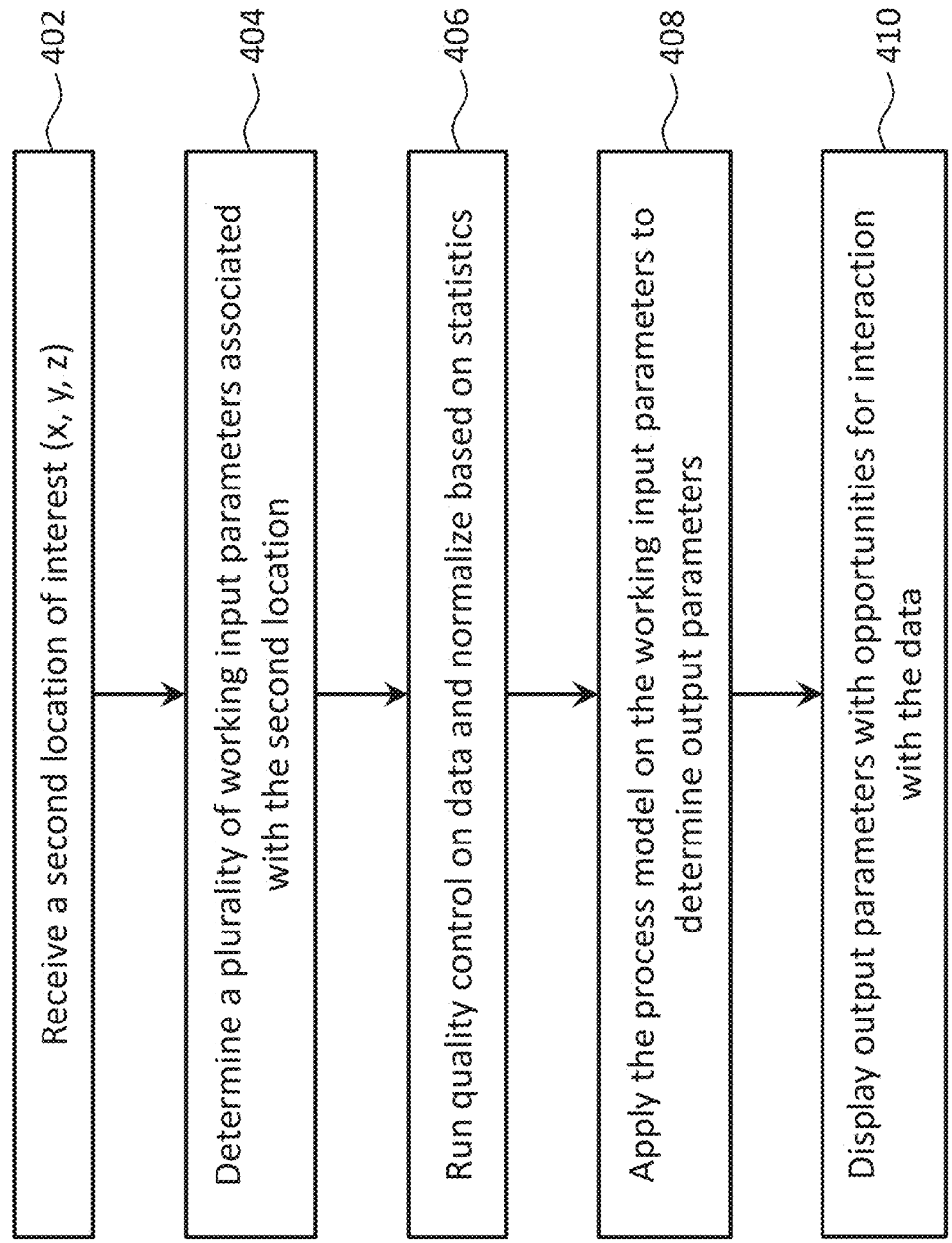
FIG. 4 illustrates a process flow for applying the process model to determine a seismic risk value, according to some embodiments.

Operation of training engine 121 to derive process model 236 is described as process flow 300 in FIG. 3, and operation of seismic risk manager 122 in applying process model 236 is described as process flow 400 in FIG. 4.

FIG. 3 illustrates process flow 300 performed by process model manager 228 to derive process model 236, according to some embodiments.

In operation, process model manager 228 may receive a first location at which values of a plurality of training input parameters may be determined, and at least one training seismic risk value is known from independent sources to derive process model 236. In one example, process model manager 228 may receive the first location from the user through a user interface provided through online platform 180. In one example, the first location may be a control location. The control location may be a location at which values of a plurality of training input parameters can be determined and at least one training seismic risk value is known from independent sources. The plurality of training input parameters and at least one training seismic risk value enables process model manager 228 in deriving an accurate model.

In step 302, process model manager 228 may receive a plurality of training input parameters at the first location. A non-exhaustive example list of the plurality of training input parameters include, but are not limited to true injection depth information, true formation information, permeability information, three-dimensional fault map information, fluid injection information, seismic activity information, geologic formation information, geologic hazard information, wellbore operations information, well architecture parameters and completion parameters. The geologic formation information at the first location may include, but are not limited to, formation depth, formation thickness, geographic extent of the formation around the given location, a sequence stratigraphic column, structural deformation, presence of overlying and/or underlying seals, lithology, depositional environment, porosity, permeability, an original pressure or pressure gradient, a current pressure or pressure gradient, pore space, geologic age, fault strike, fault dip, fault type, formations impacted by faulting, geologic age at time of fault, fault depth, and/or fault length. The geologic hazard information at the first location may include, but are not limited to, difference in horizontal distance and depth from a location to a fault, presence of a fault in overlying or underlying formations, fault within basement, fault slip potential, distance to known, previous earthquakes, magnitude of known, previous earthquakes, hypocenter depth of known, previous earthquakes, frequency of earthquakes, date of known, previous earthquakes, and/or human population density within a defined radius of the given location. The wellbore operations information at the first location may include, but are not limited to, wellbore architecture parameters, parameters of completion, whether or not flowback has been reported, an average injection rate, a percentage of fluid recovery, a fluid type, a proppant type, a proppant staging total (i.e., a ratio of proppant weight per volume of treatment fluid), a total stimulated length, a total treatment volume, an average treatment fluid volume per lateral foot, a number of different types of treatment fluids, cumulative production volume, cumulative injection or disposal volume, bottomhole flowing pressure, shut-in pressure, average injection pressure, maximum injection pressure, permitted injection or disposal volume, permitted injection or disposal pressure or pressure gradient, proportion of permitted injection volume used, proportion of permitted injection pressure used, water transfer volumes, and/or hydrocarbon transfer volumes, parameters such as position of wellbore and direction of wellbore obtained during measurement-while-drilling operations, parameters such as sonic logs, neutron density logs and gamma ray logs obtained during logging-while-drilling operations, and/or wireline operations. The well architecture parameters at the first location may include, but are not limited to, drilling permit date, type of drilling permit, measure of casing integrity, an azimuth of the well, a lateral length of the wellbore, total measured depth of wellbore, true vertical depth of wellbore, and/or true vertical depth of each perforation. The completion parameters at the first location may include, but are not limited to, date of completion, permitted depth range for production, injection, disposal, or mining, perforation depth, date of perforation, a total perforated length, plug depth, date of plug, a length of non-completed intervals, a reason for non-completed intervals, a stage length, and/or completion method. In one embodiment, the training input parameters may be input by the user. Combinations of the training input parameters may be considered in deriving process model 236 and in a Monte Carlo simulation to determine the influence value of each training input parameter on seismic risk.

In step 304, process model manager 228 may obtain at least one training seismic value at the first location from training output database 226. Process model manager 228 may populate the training output data from independent sources such as public source(s) 260 or private source(s) 262. The at least one training seismic risk value may be an overall seismic risk value. The overall seismic risk value may be derived as a combination of the geologic formation seismic risk score, the geologic hazard seismic risk score, and the wellbore operational seismic risk score. Data associated with all training input parameters are pre-processed for quality control. In step 306, input parameters processing engine 202 may run quality control on the training input parameters and normalize the training input parameters according to their known distributions and statistics based on a large data set.

In step 308, process model manager 228 derives process model 236 which relates the training input parameters to the training output parameters of at least one training seismic risk value. The training input parameters for deriving the process model may be scaled by a yet-to-be-determined influence value. In some examples, process model manager 228 derives process model 236 that relates the overall seismic risk value to a combination of geologic formation seismic risk score, the geologic hazard seismic risk score, and the wellbore operational seismic risk score. In some embodiments, each of the geologic formation seismic risk score, the geologic hazard seismic risk score, and the wellbore operational seismic risk score may be modeled as a linear combination of other identified input parameters. A general description of process model 236 is given by:

$$Y(x,y,z) = k_A X_A(x,y,z) + k_B X_B(x,y,z) + k_C X_C(x,y,z); \quad (1)$$

where $X_A$, $X_B$ and $X_C$ represent the geologic formation seismic risk score, the geologic hazard seismic risk score, and the wellbore operational seismic risk score, and $k_A$, $k_B$, and $k_C$ are contributing values for each of the geologic formation seismic risk score, the geologic hazard seismic risk score, and the wellbore operational seismic risk score towards the overall seismic risk value. In an example, $k_A$, $k_B$, and $k_C$ may have a unity value, that is the overall seismic risk value is the sum of the geologic formation seismic risk score, the geologic hazard seismic risk score, and the wellbore operational seismic risk score. In another example, $k_A$, $k_B$, and $k_C$ may have a value of ⅓, that is the overall seismic risk value is the average of the geologic formation seismic risk score, the geologic hazard seismic risk score, and the wellbore operational seismic risk score. An expression for the geologic formation seismic risk score or the geologic hazard seismic risk score, or the wellbore operational seismic risk score is given by:

$$[X_M(x,y,z)]_{M=A,B,C} [i_{m_1} X_{m_1}(x,y,z) + i_{m_2} X_{m_2}(x,y,z) + \ldots + i_{m_n} X_{m_n}(x,y,z)]_{m=a,b,c}; \quad (2)$$

where $X_{a_1} \ldots X_{a_n}$ are contributing input parameters to $X_A$, etc., and $i_{a_1} \ldots i_{a_n}$ are corresponding influence values of the contributing training input parameters to $X_A$. The influence value may be a scalar value that reflects a contribution that the training input parameter makes to the training seismic risk value where a high value reflects a high contribution, and vice-versa.

Process model manager 228 may complete process model 236 in two steps and one optional step. One step of the two steps may include determination of the influence values, that is, $i_{a_1} \ldots i_{c_n}$. Another step of the two steps may include determination of input parameters with statistical significance and trimming process model 236. The optional step may include an introduction of a dummy variable (described later). In the step of determination of the influence values, process model manager 228 may prepare the training input parameters that have been selected and normalized, to be simulated.

In step 310, process model manager 228 may input process model 236 into simulation engine 230 to simulate and perform multiple iterations with the training input parameter data from the first location based on a statistical data model. In an example, simulation engine 230 may use a Monte Carlo simulation. In some examples, simulation techniques that can be used in estimate the possible outcomes of an uncertain event, not described here, are contemplated herein. Simulation engine 230 performs a simulation of process model 236 with a series of control data sets where the at least one training seismic risk value associated with the first location is known through independent sources. In step 312, simulation engine 230 may determine influence values for each input training parameter contributing to process model 236. Through the simulation, simulation engine 230 may derive the influence value of each of the input parameters. During each iteration, simulation engine 230 may adjust the training input parameters according to their individual data model to simulate a statistical distribution that would have been present when the data for each training input parameter was measured. In one example, based on the multiple, statistically-varying outputs from the Monte Carlo simulation, simulation engine 230 may determine respective influence values that best relate the input parameters to the output parameters.

In some examples, the output parameter or seismic risk may only be known as an overall value. That is, the component seismic risk of geologic formation seismic risk, geologic hazard seismic risk, and wellbore operational seismic risk may not be known individually. In such cases, process model manager 228 may still use the Monte Carlo simulation effectively to derive the influence values of the training input parameters, however the completed process model may be used only to assess overall seismic risk value at unknown locations. As part of the Monte Carlo simulation, simulation engine 230 may scale each normalized training input parameter to process model 236 by an estimation of the influence value of each training input parameter. In one example, an initial estimation of the influence value of each training input parameter may be provided by an expert in a relevant field. In some examples, the initial estimation of the influence value of each training input parameter is random or unity. On each iteration of the Monte Carlo simulation, simulation engine 230 may first adjust the input parameters according to their individual data model to simulate a statistical distribution that would have been present when the data for each input parameter was measured. Simulation engine 230 may then iteratively refine the estimation of the influence values of each input parameter. Simulation engine 230 may run the Monte Carlo simulation multiple times to arrive at a most likely value for each of the influence values. In an example, simulation engine 230 may run the Monte Carlo simulation 20,000 times to allow the influence values to converge to values that, according to the Monte Carlo simulation, may reflect the most likely scenarios, most likely results, and most likely influence values. The use of an expert-derived initial value for influence value may be desirable as it may be more likely to allow the simulation to converge on a true value for the influence value. In some examples, process model manager 228 may use an artificial intelligence or machine learning algorithm in place of simulation to determine the influence values of each of the input parameters. Other examples that perform similar simulation to determine each input parameter's influence values not described here are contemplated herein.

Figure 7:
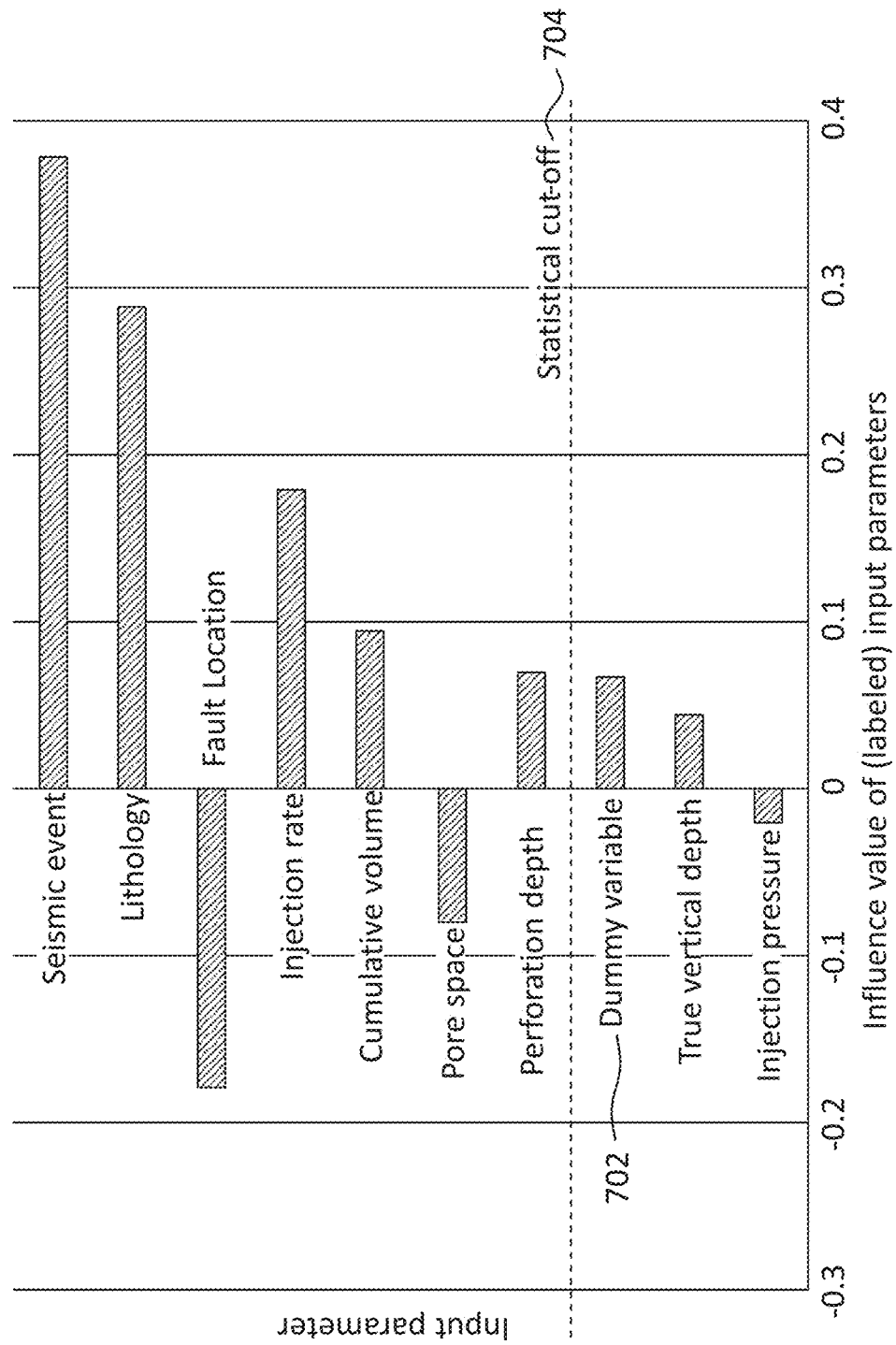
FIG. 7 illustrates an example of influence values of input parameters, according to some embodiments.

Once the influence values of each input parameter have been determined, process model manager 228 may select training input parameters that may be used by a subsequent seismic risk assessment. In an example, process model manager 228 may determine a level of significance which is represented by a minimum absolute value of influence value. In an example, process model manager 228 may set to zero any influence value which has an absolute value less than or equal to the minimum absolute value. In an example, an expert in the field may determine the minimum absolute value of influence value. In some examples, process model manager 228 may introduce a known unrelated input parameter (also known as a dummy variable) into process model 236 and subject the unknown unrelated input parameter to the simulation that determines influence values for all input parameters (now including the known unrelated input parameter). In the example, the absolute value of the influence value that the Monte Carlo simulation determines for the known unrelated input parameter may define the minimum absolute value of the influence value. An example of the influence values of input parameters, including a dummy variable 702 and a statistical cut-off-line 704, is shown in FIG. 7. In some examples, process model manager 228 may not select any statistically significant input parameters and may include all input parameters in process model 236 scaled by their influence values. With the above steps, process model manager 228 may complete process model 236. Process model manager 228 may apply the completed process model 236 to determine a seismic risk at a given location subject to input parameters.

FIG. 4 illustrates process flow 400 for applying process model 236 to determine output parameters at a second location, according to some embodiments. The determination of an output parameter may allow the assessment of overall seismic risk. In step 402, seismic risk manager 122 may receive the second location (for example, in terms of latitude and longitude coordinates, and depth (x,y,z)). The second location may be any location at which a seismic risk value is to be determined; for example, the location of a wellbore. In some examples, the well location may be a proposed location provided by a user, and which may be under assessment for use for wastewater disposal or another application. In some examples, the well location may be an already existing disposal location identified by EI determination engine 208 by analysis of water transfer records reported to and maintained by a regulatory body, and stored in training input database 224 or working input database 232. In some examples, seismic risk manager 122 may receive the second location from the input of the user through online platform 180. In one example, online platform 180 may provide a text box to input a name or location of the second location. Based on the input, online platform 180 may list matching locations for a user to choose. In another example, online platform 180 may provide a map on which a user may mark a location of choice. Based on the marking, online platform 180 may identify the location as the second location. Seismic risk manager 122 may use the location input to identify the location for SWD or correlate the chosen location with public source(s) 260 to identify an established wellbore location or determine the location to be a new SWD site. In some examples, online platform 180 may receive location information associated with at least one water transportation vehicle. The transportation vehicle may be owned by an EI operator, a contractor associated with the operator or a third-party vendor providing material transportation services. In an example, the location information may be a parking location or transportation vehicle depot. EI determination engine 208 may process location information associated with at least one water transportation vehicle from sources including location data source 280, private source(s) 262 and/or public source(s) 260 to determine a disposal location used by the at least one water transportation vehicle. For example, EI determination engine 208 may process travel route information of vehicles associated with the location information. Repeated travel routes between two or more locations including factors such as vehicle speed between the locations, number of trips, initial location, final location and such factors, may provide a source location and disposal location. Based on the identifying the disposal location, EI determination engine 208 may designate the disposal location as the second location. Identifying EI location is described in detail in U.S. application Ser. No. 17/145,892 filed on Jan. 11, 2021, which is incorporated herein in its entirety. In some examples, water disposal location information may be obtained from at least one water disposal contractor providing wastewater disposal services. For example, water disposal location information may be collected directly, indirectly or anonymously from water disposal contractors, EI operators and supporting industries associated with EI operations. EI determination engine 208 may use the water disposal location information to determine the second location. In some examples, water disposal location information may be obtained from transfer records reported to and maintained by a regulatory body. EI determination engine 208 may analyze the transfer records reported to and maintained by a regulatory body to identify a destination well from the disposal lease. EI determination engine 208 may determine the identified destination well as the second location.

In step 404, seismic risk manager 122 determines a plurality of working input parameters associated with the second location. Determination of working input parameters associated with the second location may be substantially similar to that of the determination of the training input parameters except that the second location is not a control location. In some examples, the working input parameters may be same or substantially same as the training input parameters.

In step 406, input parameter processing engine 202 may run quality control on the plurality of working input parameters, and normalize the plurality of working input parameters according to their known distributions and statistics based on a large data set (that is, statistical parameters). In one or more embodiments, all working input parameters are pre-processed for quality control and are normalized by input parameter processing engine 202 and stored in working input database 232 based on their known data model and/or based on the datasets included in the database. In an example, the process of normalization may occur as data associated with the working input parameters is added to working input database 232. The quality control and normalization of the working input parameters is substantially similar or similar to that of how the quality control and normalization of the training input parameters are performed. In some examples, the working input parameters may be the same as the training input parameters but used in different contexts.

In step 408, seismic risk manager 122 may apply process model 236 to the plurality of working input parameters to determine an output parameter. Process model 236 may perform an assessment of a seismic risk based on values of working input parameters at the second location and depth (i.e., x, y, z) of interest. To determine the assessment of seismic risk, seismic risk manager 122 may determine a value of each working input parameter as a function of x, y, and z. Seismic risk manager 122 may normalize each working input parameter by a statistical measure of the input parameter which is scaled by the determined influence value for each working input parameter. Seismic risk manager 122 may combine the scaled values for each working input parameter to generate an estimate of seismic risk according to process model 236. In some examples, the estimate of seismic risk may be comprised of one or more of geologic formation seismic risk score, geologic hazard seismic risk score, and wellbore operational seismic risk score. In another example, the estimate of seismic risk is an overall seismic risk value.

Figure 10:
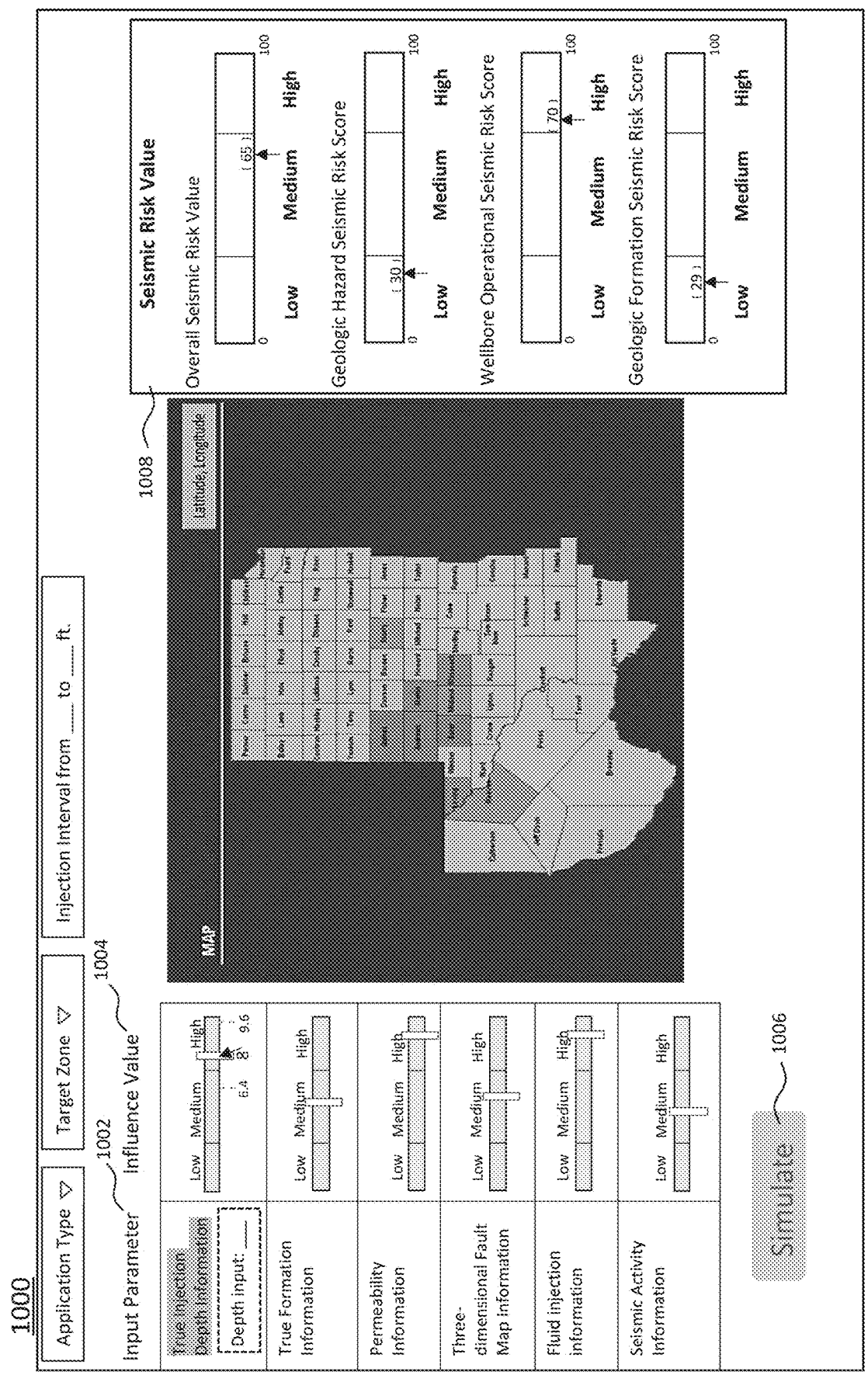
FIG. 10 illustrates a user interface diagram illustrating risk scores based on working input parameters for a given location, according to one embodiment.

In step 410, visualization engine 238 may display the output parameter with opportunities for interaction with the data. In an example, a display tool provided by the online platform 180 may allow interaction with the input parameters and output parameters, for example, to allow 'what-if' types of analysis. In an example, the output of process model 236 may be an overall seismic risk value provided in a numerical value ranging from 0 to 100, where 0 may represent no seismic risk, and 100 may represent a maximum seismic risk. An example of such visualization is illustrated in FIG. 10. Each user may impart different meanings or different levels of significance to values along a range, and therefore visualization engine 238 may define ranges of values that aggregate levels of seismic risk into bands that have a meaning for the users. For example, a user who may be an operator may see the seismic values differently from a user who may be a government employee or a user who may be an academician. In an example, visualization engine 238 may define and present three bands which are labeled as low, medium, and high, or alternatively, green, yellow, and red. In an example, visualization engine 238 may display the determined seismic risk value to the user as a value or as a banded value. In another example, visualization engine 238 may display the seismic risk value in color-codes to represent a banding. For example, visualization engine 238 may display the seismic risk value in green to represent a low risk banding. In some examples, visualization engine 238 may provide a key that may allow the display tool to provide context to the seismic risk value. For example, the key may relate the value of seismic risk to seismic events that have already occurred.

Figure 11:
FIG. 11 illustrates a user interface diagram illustrating an exemplary disposal permit scorecard associated with wastewater disposal action at a given location, according to one embodiment.

In some examples, visualization engine 238 may identify the working input parameter values to the seismic risk value, weighted by their respective influence values, and displayed in the display tool. In some examples, visualization engine 238 may place the displayed working inputs parameters into bands, and color-code the working input parameters on a display. In some examples, visualization engine 238 may map the input parameters used in process model 236 to seismic risk factors monitored by a regulating body such as the Texas RRC. An example of such visualization is illustrated in FIG. 11. Visualization engine 238 may apply scaling factors or conversion algorithms that can convert the seismic risk values managed by process model 236 into the same or similar values that are managed by the regulating bodies. In one or more of the above described examples, visualization engine 238 may display seismic risk value as components including one or more of geologic formation seismic risk score, geologic hazard seismic risk score, and wellbore operational seismic risk score that make up the seismic risk value.

In some examples, the display tool may display the influence values of each working input parameter as a separate output. Through the display of the influence values of each working input parameter as a separate output, visualization engine 238 may indicate the user the significance of contribution of each working input parameter. In an example, visuals of the significance of contribution of each working input parameter may allow the user to compare scenarios for wastewater disposal (or other fluid injection) and determine an optimum strategy. In an example, the display tool may provide the facility to vary input parameters which the user may control to support a 'what-if' style analysis. In an example, the display tool may provide a slider input widget that allows an input parameter to be varied by ±20% and correspondingly output seismic risk assessment may be re-computed. An example of such a working input parameter is injection pressure. In another example, the display tool may provide a drop-down selection widget to the user for other working input parameters which cannot be represented on a continuous scale. In some examples, the working input parameter values presented by the user may be derived from knowledge of a selection or range of possible input parameter values. In an example, the range of possible input parameter values may be derived from values stored within the working input database 232. For example, depths in a wellbore where wastewater or other fluid may be injected may be based on where there are open perforations in the wellbore. Visualization engine 238 may make the depths of open perforations available to the display tool from working input database 232 to be presented to the user of the display tool in, for example, a drop-down menu for selection. Visualization engine 238 may reflect changes in the seismic risk value in response to the changes made to the working input parameter by the user in the display tool. In another example, the display tool may allow the user to simulate new perforations in a wellbore while displaying a seismic risk associated with each new perforation. In examples, the display tool may update its assessment of seismic risk associated with an updated input parameter in near-real time. Such simulation experience may support the user in making decisions to recomplete the well and access the new formation.

Visualization engine 238 may allow a comparison of the assessed seismic risk and the working input parameters and output parameters against regulations and standards. This comparison may help the operator to determine whether a SWD well permit or a hydraulic fracturing drill permit application would be subject to a seismic risk review by a regulatory agency (e.g., Texas RRC).

Figure 12:
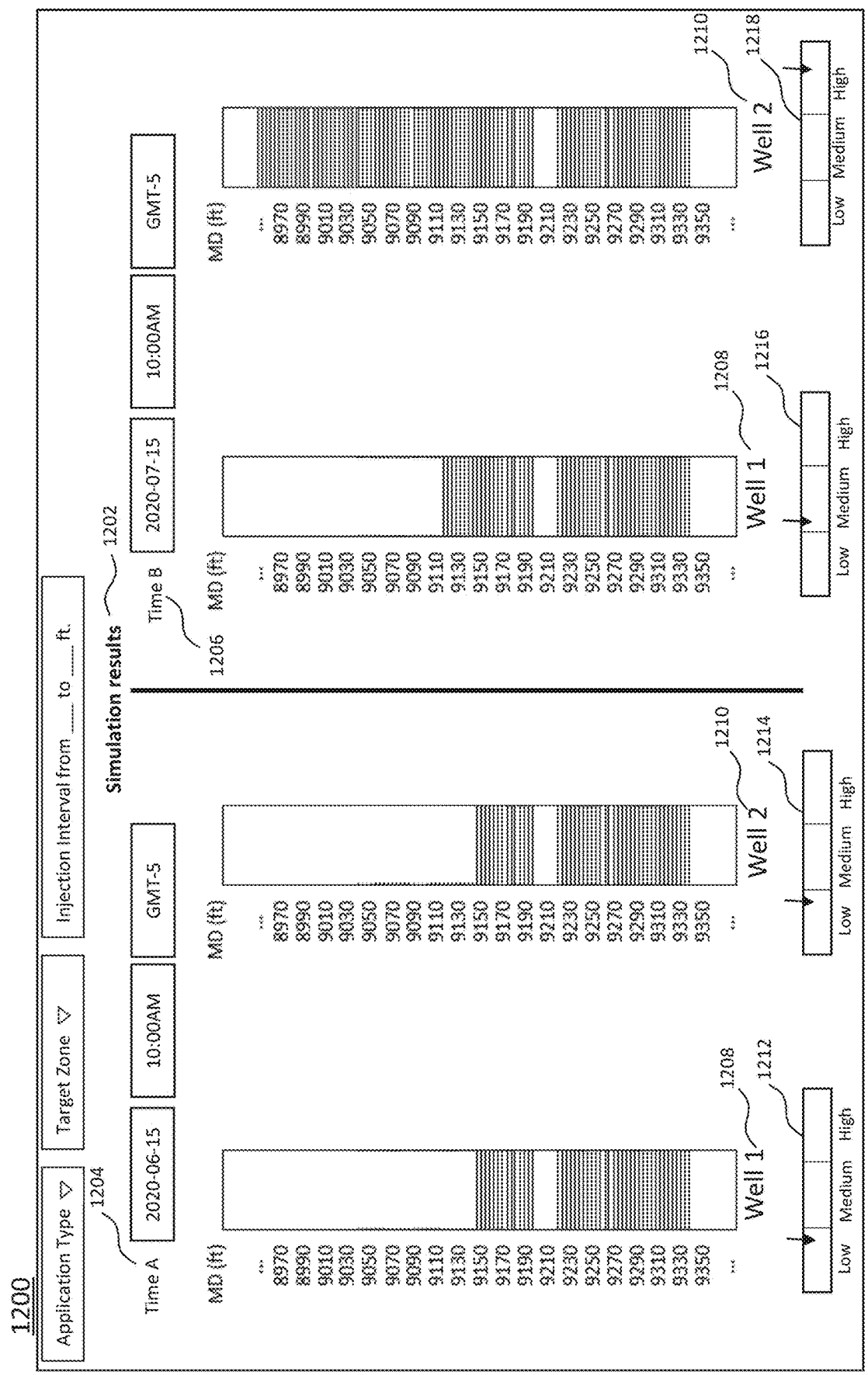
FIG. 12 illustrates a user interface diagram illustrating a time-based simulation for calculating risk score associated with wastewater disposal action at a given well, according to one embodiment.

In some examples, visualization engine 238 may allow the user to combine of one or more output parameters of a seismic risk value (e.g., geologic formation seismic risk score, geologic hazard seismic risk score, and wellbore operational seismic risk score) in pre-determined or bespoke linear or non-linear fashion to determine and display another value of interest. For example, visualization engine 238 may indicate when a formation's available pore space is decreasing or its capacity is being reached in response to changing working input parameters over a period of time. In some examples, display tool may display the capacity of a formation being reached by comparing two seismic risk scores for the same formation, or by comparing two seismic risk scores for the same location and same formation but for different time periods. In this example, the geologic hazards seismic risk score remains the same for both first and second seismic risk score, the wellbore operational seismic risk score decreases (due to the sub-parameter of an increase in pressure required to pump the same volume downhole), and geologic formation seismic risk score decreases (due to an increase in bottom hole pressure parameter). An example of such visualization is illustrated in FIG. 12. In some examples, visualization engine 238 may allow the user to modify one or more working input parameters being representative of a proposed water disposal action through the display tool. Seismic risk manager 122 may apply process model 236 on the modified one or more working input parameters to determine a second seismic risk value for the proposed water disposal. Visualization engine 238 may display the second seismic risk value for the proposed water disposal. Visualization engine 238 may display of a comparison between the seismic risk value and the second seismic risk value, the comparison being indicative of a seismic risk change associated with the proposed water disposal action. In some examples, visualization engine 238 may display a comparison of the seismic risk value and the second seismic risk value and a seismic risk trend based on the seismic risk value and the second seismic risk value. In some examples, visualization engine 238 may display a comparison of the seismic risk value and the second seismic risk value and a seismic risk trend based on the seismic risk value and the second seismic risk value. In some examples, visualization engine 238 may display a composite seismic risk value of the location determined by process model 236 based on the seismic risk value and the second seismic risk value. Process model 236 may identify a formation capacity based on the comparison of the first seismic risk value and the second seismic risk value, and visualization engine 238 may display the formation capacity.

In some examples, modifications to one or more working input parameters by a user may lead to changes in seismic risk changes associated with a plurality of respective proposed water disposal actions. For example, rate of injection may be increased or decreased by the user through the display tool. Accordingly, seismic risk changes associated with the proposed water disposal actions, that is, changing injection rate, may change. Seismic risk manager 122 may apply process model 236 on the modified one or more working input parameters to determine a seismic risk changes associated with respective proposed water disposal actions. Based on the seismic risk changes, process model 236 may identify a lowest-risk water disposal action from among the respective proposed water disposal actions. Accordingly, visualization engine 238 may display the lowest-risk water disposal action from among the respective proposed water disposal actions. In some examples, visualization engine 238 selects the plurality of respective proposed water disposal actions according to a distance of available saltwater disposal wells from a produced water origin.

The equation that relates the input parameters of process model 236 to the output parameters of process model 236 is of the form:

$$Y(x,y,z)=i_a X_a(x,y,z)+i_b X_b(x,y,z)+ \ldots +i_n X_n(x,y,z); \quad (3)$$

where $X_a \ldots X_n$ are input parameters from effect a ... n, $i_a \ldots i_n$ are influence values of the input parameters from effect a ... n and Y is the output parameter. This equation may be rearranged to have any input parameter, $X_a \ldots X_n$, as a function of the remaining input parameters and Y. Therefore, as long as an accurate estimation of the output parameter, Y, can be determined, then using Y, equation (3) may be rearranged to estimate any other, single unknown input working parameter. That is, seismic risk value becomes an input to the estimation function and any other input parameter, e.g., lithology, becomes an output. In other words, a seismic event may be used as an input into process model 236 to determine the lithology of the affected region. Also, if there is a seismic event in a given region, the seismic event can be used as an input to identify or update at least one working input parameter according to an occurrence of the seismic event.

Figure 8:
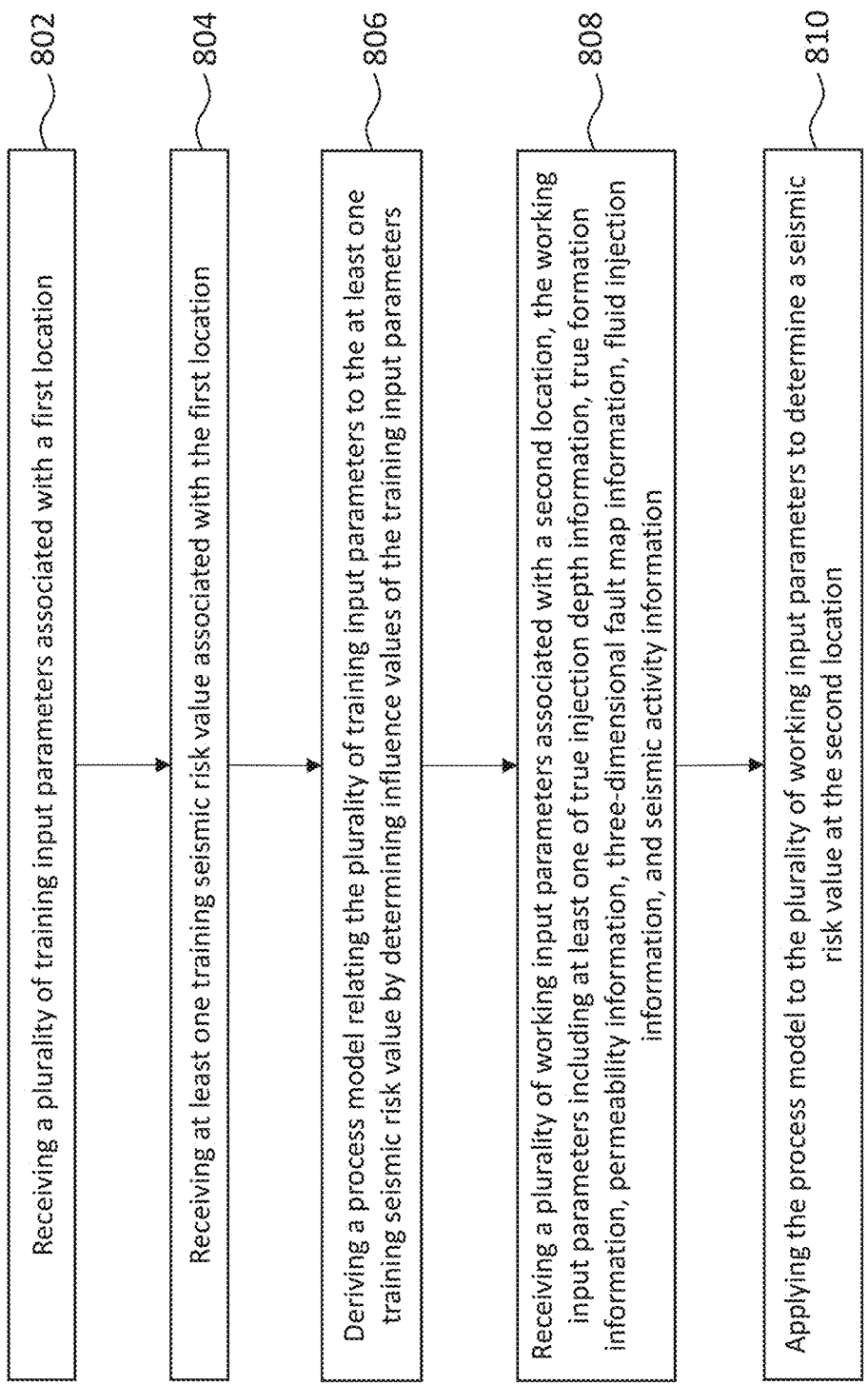
FIG. 8 illustrates a process flow for determining seismic risk associated with wastewater disposal to be carried out by at least one processor configured to execute instructions, according to one embodiment.

FIG. 8 illustrates a process flow 800 for determining seismic risk associated with wastewater disposal (or other fluid injection), according to one embodiment. In a brief overview of an implementation of process flow 800, at step 802, a plurality of training input parameters associated with a first location is received. At step 804, at least one training seismic risk value associated with the first location is received. At step 806, a process model is derived relating the plurality of training input parameters to the at least one training seismic risk value by determining influence values of the training input parameters. At step 808, a plurality of working input parameters associated with a second location is received. At step 810, the process model is applied to the plurality of working input parameters to determine a seismic risk value at the second location.

Step 802 includes receiving a plurality of training input parameters associated with a first location. The plurality of training input parameters may include at least one of true injection depth information, true formation information, permeability information, three-dimensional fault map information, fluid injection information, seismic activity information, geologic formation information, geologic hazard information, wellbore operations information at the first location, well architecture parameters at the first location, completion parameters at the first location, and such training parameters. Other training input parameters not disclosed here are contemplated herein. According to an implementation, process model manager 228 receives the plurality of training input parameters associated with the first location.

Step 804 includes receiving at least one training seismic risk value associated with the first location. The training seismic risk value may include at least one of a geologic formation seismic risk score, a geologic hazard seismic risk score, and a wellbore operational seismic risk score. The at least one training seismic risk value may be obtained from independent sources. According to an implementation, process model manager 228 receives the at least one training seismic risk value associated with the first location.

Step 806 includes deriving a process model (for example, process model 236) relating the plurality of training input parameters to the at least one training seismic risk value by determining influence values of the training input parameters. Deriving the process model may include performing a plurality of simulations on the training input parameters and the training seismic risk value. In one example, the plurality of simulations are performed according to a Monte Carlo simulation or a machine learning simulation. In some example, deriving the process model may include comparing the influence values to a threshold and eliminating influence values not exceeding the threshold. According to an implementation, process model manager 228 derives the process model 236.

Step 808 includes receiving a plurality of working input parameters associated with a second location. The working input parameters may include at least one of true injection depth information, true formation information, permeability information, three-dimensional fault map information, fluid injection information, and seismic activity information. Other working input parameters not disclosed here are contemplated herein. In some examples, at least one of the working input parameters may be generated by providing a numerical score to a qualitative parameter. According to an implementation, process model 236 receives the plurality of working input parameters.

The true injection depth information may be determined by generating a time-depth profile of activity within a wellbore at the second location, and determining the true injection depth information according to the time-depth profile of activity of the wellbore at the second location. In some examples, generating the time-depth profile of activity may be based on wellbore perforation data, wellbore plug data, wellbore permit data, and wellbore injection data. In some examples, the true injection depth information may be determined according to a plurality of time-depth profiles of activity at a plurality of locations. In some examples, the plurality of locations may be selected according to a distance from the second location. According to an implementation, true injection depth calculator 210 calculates the true injection depth information. The true formation information may be determined by generating a structural stratigraphic model at the second location, and determining the true formation information of a wellbore based on the structural stratigraphic model and the true injection depth. The true formation information may include a cumulative measure of fluid injected into a geologic formation associated with the true formation information. According to an implementation, true formation information manager 212 may determine the true injection depth information. The permeability information may be determined based on at least one of classification based on lithology, derivation based on rock samples, and estimation based on a model of contour intervals. According to an implementation, geology and lithology information manager 214 may determine the permeability information. The three-dimensional fault map information may be determined by generating at least one three-dimensional fault line map by digitizing fault research data, and associating a formation, a depth, a strike, a dip, and a length with at least one fault described in the fault research data. According to an implementation, three-dimensional fault map generator 216 may determine the three-dimensional fault map information. In some examples, the fluid injection information may be determined by including measurements over time of fluid volumes and fluid pressures of injected fluid and removed fluid corresponding to specific true injection depths and specific true formations. In some examples, the fluid injection information is obtained from sensors located on or within a wellbore. In some examples, the fluid injection information is obtained from regulatory filings. According to an implementation, fluid information manager 218 may determine the fluid injection information. The seismic activity information may be obtained from at least one of a sensor network and an earthquake catalog. According to an implementation, seismic activity manager 220 may obtain the seismic activity information.

Step 810 includes applying process model 236 to the plurality of working input parameters to determine a seismic risk value at the second location. The seismic risk value includes at least one of a geologic formation seismic risk score, a geologic hazard seismic risk score, and a wellbore operational seismic risk score. In some examples, visualization engine 238 through the display tool may display a comparison between and a pre-determined threshold seismic risk value. The pre-determined threshold seismic risk value may be determined according to a regulatory threshold.

In some examples, process flow 800 may include determining a plurality of seismic risk changes associated with a plurality of respective proposed water disposal actions, and identifying a lowest-risk water disposal action from among the plurality of respective proposed water disposal actions. In one example, the plurality of respective proposed water disposal actions are selected according to a distance of available saltwater disposal wells from a produced water origin.

In some examples, process flow 800 may include receiving a location information associated with at least one water transportation vehicle. The location information may be received through the display tool. Based on the location information, EI determination engine 208 may determine a disposal location used by the at least one water transportation vehicle. EI determination engine 208 may designate the disposal location as the second location. In some examples, process flow 800 may receive water disposal location information from at least one water disposal contractor. Based on the water disposal location information, EI determination engine 208 may determine the second location according to the water disposal location information.

In some examples, process flow 800 may include receiving a second plurality of working input parameters associated with a second time. The location information may be received through the display tool. Seismic risk manager 122 may apply process model 236 to the second plurality of working input parameters to determine a second seismic risk value. Process model 236 may compare the seismic risk value and the second seismic risk value to identify a seismic risk trend. In some examples, process model 236 may identify a formation capacity by comparing the first seismic risk value and the second seismic risk value. In some examples, there may be an occurrence of a seismic event at the second location. In response to occurrence of the seismic event, the process flow 800 may include identifying at least one working input parameter at the second location according to an occurrence of the seismic event.

Figure 9A:
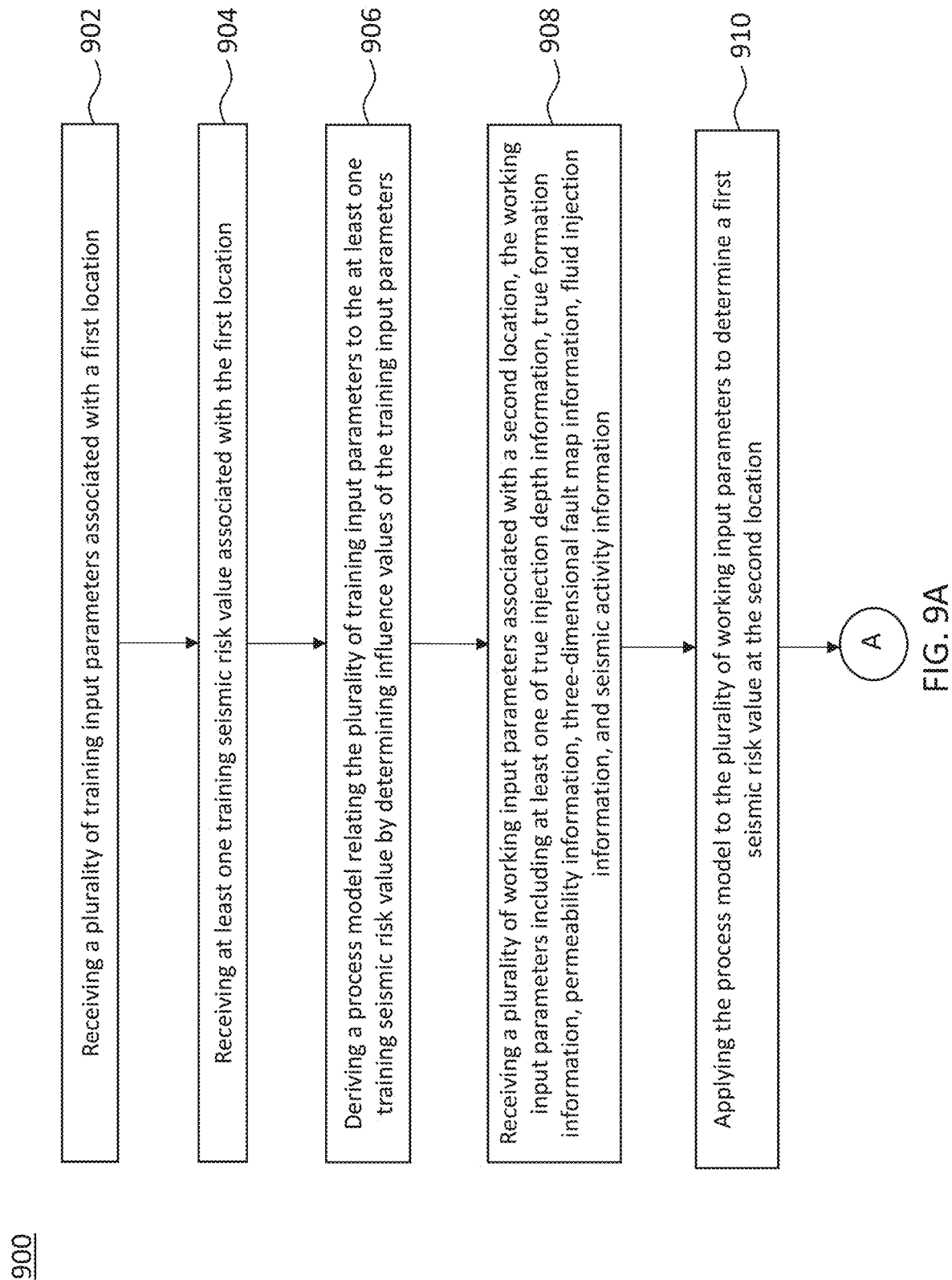
FIGS. 9A and 9B illustrate a process flow for determining seismic risk change associated with wastewater disposal action at a given location, according to one embodiment.
Figure 9B:
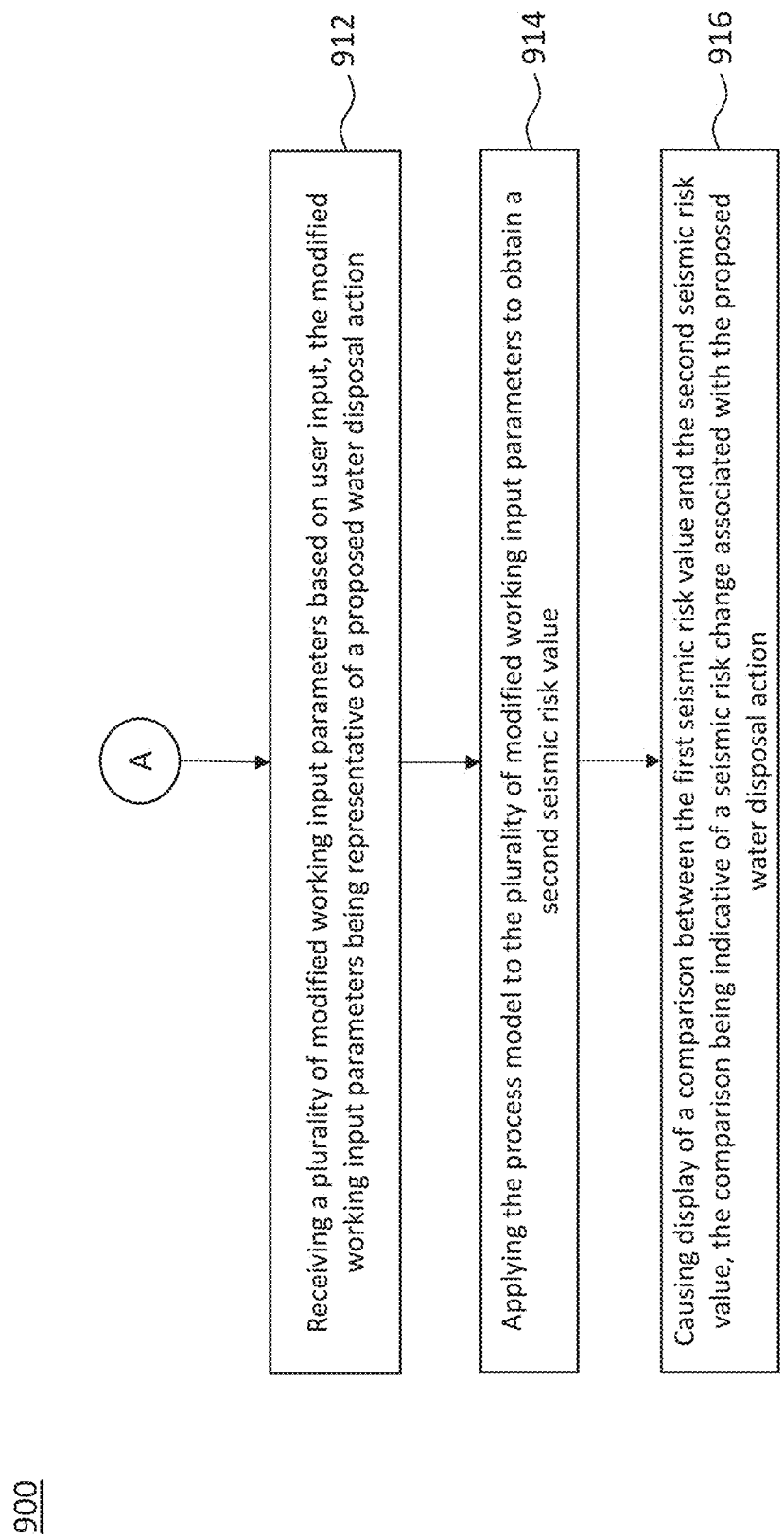

FIGS. 9A and 9B illustrate a process flow 900 for determining seismic risk change associated with wastewater disposal (or other fluid injection) action at a given location, according to one embodiment. In a brief overview of an implementation of process flow 900, at step 902, a plurality of training input parameters associated with a first location is received. At step 904, at least one training seismic risk value associated with the first location is received. At step 906, a process model is derived relating the plurality of training input parameters to the at least one training seismic risk value by determining influence values of the training input parameters. At step 908, a plurality of working input parameters associated with a second location is received. At step 910, the process model is applied to the plurality of working input parameters to determine a seismic risk value at the second location. At step 912, a plurality of modified working input parameters based on user input. The modified working input parameters may be representative of a proposed water disposal action and/or a time of execution of the proposed water disposal action. At step 914, the process model may be applied to the plurality of modified working input parameters to obtain a second seismic risk value. At step 914, a comparison between the seismic risk value and the second seismic risk value may be displayed. The comparison may be indicative of a seismic risk change associated with the proposed water disposal action.

Step 902 includes receiving a plurality of training input parameters associated with a first location. The plurality of training input parameters may include at least one of true injection depth information, true formation information, permeability information, three-dimensional fault map information, fluid injection information, seismic activity information, geologic formation information, geologic hazard information, wellbore operations information at the first location, well architecture parameters at the first location, completion parameters at the first location, and such training parameters. Other training input parameters not disclosed here are contemplated herein. According to an implementation, process model manager 228 receives the plurality of training input parameters associated with the first location.

Step 904 includes receiving at least one training seismic risk value associated with the first location. The at least one training seismic risk value may be obtained from independent sources. The training seismic risk value may include at least one of a geologic formation seismic risk score, a geologic hazard seismic risk score, and a wellbore operational seismic risk score. The at least one training seismic risk value may be obtained from independent sources. According to an implementation, process model manager 228 receives the at least one training seismic risk value associated with the first location.

Step 906 includes deriving a process model (for example, process model 236) relating the plurality of training input parameters to the at least one training seismic risk value by determining influence values of the training input parameters. Deriving the process model includes performing a plurality of simulations on the training input parameters and the training seismic risk value. In one example, the plurality of simulations are performed according to a Monte Carlo simulation or a machine learning simulation. In some examples, deriving the process model may include comparing the influence values to a threshold, and eliminating influence values not exceeding the threshold. According to an implementation, process model manager 228 derives the process model 236.

Step 908 includes receiving a plurality of working input parameters associated with a second location. The working input parameters may include at least one of true injection depth information, true formation information, permeability information, three-dimensional fault map information, fluid injection information, and seismic activity information. Other working input parameters not disclosed here are contemplated herein. In some examples, at least one of the working input parameters may be generated by providing a numerical score to a qualitative parameter. According to an implementation, process model 236 receives the plurality of working input parameters.

The true injection depth information may be determined by generating a time-depth profile of activity within a wellbore at the second location, and determining the true injection depth information according to the time-depth profile of activity of the wellbore at the second location. In some examples, generating the time-depth profile of activity may be based on wellbore perforation data, wellbore plug data, wellbore permit data, and wellbore injection data. In some examples, the true injection depth information may be determined according to a plurality of time-depth profiles of activity at a plurality of locations. In some examples, the plurality of locations may be selected according to a distance from the second location. According to an implementation, true injection depth calculator 210 calculates the true injection depth information. The true formation information may be determined by generating a structural stratigraphic model at the second location, and determining the true formation information of a wellbore based on the structural stratigraphic model and the true injection depth. The true formation information may include a cumulative measure of fluid injected into a geologic formation associated with the true formation information. According to an implementation, true formation information manager 212 may determine the true injection depth information. The permeability information may be determined based on at least one of classification based on lithology, derivation based on rock samples, and estimation based on a model of contour intervals. According to an implementation, geology and lithology information manager 214 may determine the permeability information. The three-dimensional fault map information may be determined by generating at least one three-dimensional fault line map by digitizing fault research data, and associating a formation, a depth, a strike, a dip, and a length with at least one fault described in the fault research data. According to an implementation, three-dimensional fault map generator 216 may determine the three-dimensional fault map information. In some examples, the fluid injection information may be determined by including measurements over time of fluid volumes and fluid pressures of injected fluid and removed fluid corresponding to specific true injection depths and specific true formations. In some examples, the fluid injection information is obtained from sensors located on or within a wellbore. In some examples, the fluid injection information is obtained from regulatory filings. According to an implementation, fluid information manager 218 may determine the fluid injection information. The seismic activity information may be obtained from at least one of a sensor network and an earthquake catalog. According to an implementation, seismic activity manager 220 may obtain the seismic activity information.

Step 910 includes applying process model 236 to the plurality of working input parameters to determine a seismic risk value at the second location. The seismic risk value includes at least one of a geologic formation seismic risk score, a geologic hazard seismic risk score, and a wellbore operational seismic risk score.

Step 912 includes receiving a plurality of modified working input parameters based on user input, the modified working input parameters being representative of a proposed water disposal action and/or a time of execution of the proposed water disposal action. According to an implementation, visualization engine 238 may receive the plurality of working input parameters.

Step 914 includes applying process model 236 to the plurality of modified working input parameters to obtain a second seismic risk value.

Step 916 includes causing a display of a comparison between the seismic risk value and the second seismic risk value, the comparison being indicative of a seismic risk change and/or a seismic risk trend associated with the proposed water disposal action and/or the time of execution of the proposed water disposal action. According to an implementation, visualization engine 238 may display the comparison between the seismic risk value and the second seismic risk value and an example of such display is illustrated in FIG. 12.

FIG. 10 is an example user interface diagram 1000 illustrating risk scores based on working input parameters for a given location, according to one embodiment. FIG. 10 illustrates an example display tool that enables a user to provide input parameters and view resulting seismic risk value and influence parameters determined by process model 236. The display tool may be provided as a part of online platform 180. User interface diagram 1000 illustrates input parameters 1002, influence values 1004, simulate option 1006, and seismic risk value 1008. Input parameters 1002 are the working input parameters that are received from the user for a given location. A resultant seismic risk value based on input parameters 1002 is shown in a table providing seismic risk value 1008. In an example, seismic risk value is represented in a numerical value ranging from 0 to 100, where 0 may represent no seismic risk, and 100 may represent a maximum seismic risk. In the example, the seismic risk value is shown to be '65' and of medium risk type category. Also, corresponding components of the seismic risk value such as a geologic hazard seismic risk score (with value 30), a wellbore operational seismic risk score (with value 70), and a geologic formation seismic risk score (with value 29) are illustrated. The display tool provided by the online platform 180 may allow interaction with the input parameters and output parameters, for example, to allow 'what-if' types of analysis. For example, in FIG. 10, the display tool also provides a slider input widget that allows an input parameter to be varied by ±20%. On initiating a simulation based on modified influence value by using simulate user interface button 1006, a correspondingly output seismic risk assessment is re-computed and displayed. In one example, instead of using slider, the display tool may also provide an option to select a working input parameter and provide values within ±20%. In FIG. 10, the working input parameter: true injection depth information is shown to be selected by highlighting and an input option is provided to provide depth input. The display tool may only receive values within ±20%.

FIG. 11 illustrates an example user interface diagram 1100 illustrating an exemplary disposal permit scorecard associated with wastewater disposal (or other fluid injection) action at a given location, according to one embodiment. For example, user interface diagram 1100 may be useful to a user who is an operator planning to apply for a new permit for a new SWD with a regulatory body. Many times, such application for a new permit for a production or SWD well may trigger a seismic review by a regulatory body such as the Texas RRC. The seismic review may increase a time taken to review the permit application, and there is a possibility of the permit not being issued. The solution described by the disclosure may support the user in such scenarios by screening the location for possible regulatory issues or challenges. The user may provide a location of interest and working input parameters associated with the location of interest to the display tool through online platform 180. In some examples, the user may provide the working parameters that the user is aware of, including true injection depth information, true formation information, permeability information, three-dimensional fault map information, fluid injection information, and seismic activity information. In some examples, the working parameters may be available for the location of interest in working input database 232, and the user may have to choose one or more working parameters. Further, the user may choose an option for regulatory review (not shown). In response, the display tool through visualization engine 238 may map the input parameters used in process model 236 to seismic risk factors monitored by a regulating body such as the Texas RRC. An example resulting visualization is provided as illustrated in user interface diagram 1100 of FIG. 11. FIG. 11 illustrates a permit score card 1102 which shows possible scores that would indicate whether the request for permit may trigger for a regulatory review. User interface diagram 1100 illustrates factors 1104 that may be considered by approving authority for a location of interest selected by the user. The factors 1104 may include seismicity and faults, operational factor, and reservoir factor. The location of interest and surrounding places may be shown in map 1106. Also, user interface diagram 1100 illustrates scores 1108 as a result of analysis of input parameters. Scores 1108 may include a final score that may be a combination of scores associated with seismicity and faults factor, operational factor, and reservoir factor. FIG. 11 illustrates the final score as A, which indicates that the permit may be provided without triggering a review from the regulatory authority. Scores associated with seismicity and faults factor, operational factor, and reservoir factor are shown as A, C and B, respectively. The score A for the seismicity and faults factor may indicate that elements associated with seismicity and faults factor such as number of mapped faults in area of interest, horizontal miles to nearest mapped fault, feet from base of disposal to basement, number of earthquakes in the AOI, horizontal miles to nearest earthquake, maximum seismic magnitude, number of years since last earthquake and data confidence, are in favor of the user for saltwater disposal or hydraulic fracturing. The score C for the operational factor may indicate that operational such elements injection rate and/or distance to nearest mapped fault may not be favorable from seismic risk perspective, and may require some adjustment to reduce the seismic risk. The score B for reservoir factor may indicate that reservoir related elements such as static permeability, cumulative thickness and lithology may be moderately favorable for the operator from triggering a seismic risk. The solution may enable the user to determine possibility of getting the new permit before applying for the permit, thereby saving time and resources. In instances where the display tool provides adverse indication of getting permit, the user can make changes to execution plans and test the input parameters to reduce the possibility of seismic risk. The display tool may also provide a download report 1110 option to enable the user to download the permit score card report.

FIG. 12 illustrates an example user interface diagram 1200 illustrating a time-based simulation for calculating risk score associated with wastewater disposal (or other fluid injection) action at a given well, according to one embodiment. FIG. 12 illustrates the user interface allowing a user to combine one or more output parameters of a seismic risk value (e.g., geologic formation seismic risk score, geologic hazard seismic risk score, and wellbore operational seismic risk score). In the example, the display tool is displaying the capacity of a formation being reached by comparing two seismic risk scores for the same formation, or by comparing two seismic risk scores for the same location and same formation but for different time periods. In this example, the geologic hazards seismic risk score remains the same for both first and second seismic risk score, the wellbore operational seismic risk score decreases (due to the sub-parameter of an increase in pressure required to pump the same volume downhole), and geologic formation seismic risk score decreases (due to an increase in bottomhole pressure parameter). FIG. 12 illustrates simulation results 1202 indicating changing seismic risk scores for well 1 1208 and well 2 1210. Simulation results 1202 illustrates that at time A 1204, seismic risk scores was indicated as low risk (shown as 1212 and 1214) for well 1 1208 and well 2 1210. Further, at time B 1206, which is after a month, seismic risk values are indicated to be changing to medium risk (shown as 1216) and high risk (shown as 1218) for well 1 1208 and well 2 1210, respectively.

The terms "computer system," "computing device," and "computer" as may be used in the present application may include a variety of combinations of fixed and/or portable computer hardware, software, peripherals, mobile, and storage devices. These may include a plurality of individual components that are networked or otherwise linked to perform collaboratively or may include one or more stand-alone components. The hardware and software components of the computer system, computing device, and computer of the present application may include and may be included within fixed and portable devices such as desktop, laptop, and/or server. A module may be a component of a device, software, program, or system that implements some "functionality," which may be embodied as software, hardware, firmware, electronic circuitry, or etc.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single module or unit for purposes of clarity, it should be understood that the features and functions described herein may be performed by any combination of units or modules. Thus, various changes and modifications may be affected by one skilled in the art without departing from the spirit or scope of the invention as defined in the appended claim.

The examples of the systems and methods as described above are provided for illustrative purposes only and are not intended in any way to limit the scope or applicability of the present disclosure.

What is claimed is:

1. A computer-implemented method of determining seismic risk associated with fluid disposal to be carried out by at least one processor configured to execute instructions, the method comprising:

receiving a plurality of training input parameters associated with a first location, the training input parameters including at least one of true injection depth information, true formation information, permeability information, three-dimensional fault map information, fluid injection information, and seismic activity information;

receiving at least one training seismic risk value associated with the first location;

deriving a process model relating the plurality of training input parameters to the at least one training seismic risk value by determining influence values of the training input parameters;

receiving a plurality of working input parameters associated with a second location of an injection well, the working input parameters including fluid injection information at the injection well and at least one of true injection depth information, true formation information, permeability information, three-dimensional fault map information, and seismic activity information; and applying the process model to the plurality of working input parameters to determine a seismic risk value at the second location of the injection well.

2. The computer-implemented method of claim 1, wherein the training input parameters further include at least one of:
geologic formation information at the first location;
geologic hazard information at the first location;
wellbore operations information at the first location;
well architecture parameters at the first location; and
completion parameters at the first location.

3. The computer-implemented method of claim 1, wherein the working input parameters include the true injection depth information, the method further comprising:
generating a time-depth profile of activity within a wellbore at the second location indicating times and depths of injection activity at the wellbore; and
determining the true injection depth information according to the time-depth profile of activity of the wellbore at the second location, the true injection depth information being representative of the activity across the times and depths of the injection activity at the wellbore.

4. The computer-implemented method of claim 3, wherein generating the time-depth profile of activity is based on wellbore perforation data, wellbore plug data, wellbore permit data, and wellbore injection data.

5. The computer-implemented method of claim 3, wherein the true injection depth information is further determined according to a plurality of time-depth profiles of activity at a plurality of locations.

6. The computer-implemented method of claim 5, wherein the plurality of locations is selected according to a distance from the second location.

7. The computer-implemented method of claim 1, wherein the working input parameters include the true formation information, the method further comprising:
generating a structural stratigraphic model including a relative order and sequence of strata at the second location; and
determining the true formation information of a wellbore based on the structural stratigraphic model and the true injection depth.

8. The computer-implemented method of claim 1, wherein the true formation information includes a cumulative measure of fluid injected into a geologic formation associated with the true formation information.

9. The computer-implemented method of claim 1, wherein the working input parameters include the permeability information, the method further comprising:

determining the permeability information based on at least one of:
classification based on lithology,
derivation based on rock samples, and
estimation based on a model of contour intervals.

10. The computer-implemented method of claim 1, wherein the working input parameters include the three-dimensional fault map information, the method further comprising:
generating at least one three-dimensional fault line map by digitizing fault research data, and
associating a formation, a depth, a strike, a dip, and a length with at least one fault described in the fault research data.

11. The computer-implemented method of claim 1, wherein the working input parameters include the fluid injection information, the fluid injection information including measurements over time of fluid volumes and fluid pressures of injected fluid and removed fluid corresponding to specific true injection depths and specific true formations.

12. The computer-implemented method of claim 11, wherein the fluid injection information is obtained from sensors located on or within a wellbore.

13. The computer-implemented method of claim 11, wherein the fluid injection information is obtained from regulatory filings.

14. The computer-implemented method of claim 1, wherein the working input parameters include the seismic activity information, the method further comprising:
obtaining the seismic activity information from at least one of a sensor network and an earthquake catalog.

15. The computer-implemented method of claim 1, wherein the seismic risk value includes at least one of a geologic formation seismic risk score, a geologic hazard seismic risk score, and a wellbore operational seismic risk score.

16. The computer-implemented method of claim 1, further comprising generating at least one of the working input parameters by providing a numerical score to a qualitative parameter.

17. The computer-implemented method of claim 1, wherein deriving the process model further includes:
comparing the influence values to a threshold, and
eliminating influence values not exceeding the threshold.

18. The computer-implemented method of claim 1, further comprising:
receiving a plurality of modified working input parameters based on user input, the modified working input parameters being representative of a proposed water disposal action;
applying the process model to the plurality of modified working input parameters to obtain a second seismic risk value; and
causing display of a comparison between the seismic risk value and the second seismic risk value, the comparison being indicative of a seismic risk change associated with the proposed water disposal action.

19. The computer-implemented method of claim 1, further comprising:
determining a plurality of seismic risk changes associated with a plurality of respective proposed water disposal actions; and
identifying a lowest-risk water disposal action from among the plurality of respective proposed water disposal actions.

20. The computer-implemented method of claim 19, wherein the plurality of respective proposed water disposal actions are selected according to a distance of available saltwater disposal wells from a produced water origin.

21. The computer-implemented method of claim 1, further comprising:
  causing display of a comparison between the seismic risk value and a pre-determined threshold seismic risk value, wherein the pre-determined threshold seismic risk value is determined according to a regulatory threshold.

22. The computer-implemented method of claim 1, further comprising:
  receiving location information associated with at least one water transportation vehicle;
  determining a disposal location used by the at least one water transportation vehicle; and
  designating the disposal location as the second location.

23. The computer-implemented method of claim 1, further comprising:
  receiving water disposal location information from at least one water disposal contractor; and
  determining the second location according to the water disposal location information.

24. The computer-implemented method of claim 1, wherein the plurality of working input parameters are associated with a first time, the method further comprising:
  receiving a second plurality of working input parameters associated with a second time;
  applying the process model to the second plurality of working input parameters to determine a second seismic risk value; and
  comparing the seismic risk value and the second seismic risk value to identify a seismic risk trend.

25. The computer-implemented method of claim 24, further comprising identifying a formation capacity according to comparing the seismic risk value and the second seismic risk value.

26. The computer-implemented method of claim 1, wherein deriving the process model includes performing a plurality of simulations on the training input parameters and the training seismic risk value.

27. The computer-implemented method of claim 26, wherein the plurality of simulations are performed according to a Monte Carlo simulation or a machine learning simulation.

28. The computer-implemented method of claim 1, further comprising identifying at least one working input parameter at the second location according to an occurrence of a seismic event.

29. A system for determining seismic risk associated with fluid disposal, the system comprising at least one processor configured to execute instructions for:
  receiving a plurality of training input parameters associated with a first location, the training input parameters including at least one of true injection depth information, true formation information, permeability information, three-dimensional fault map information, fluid injection information, and seismic activity information;
  receiving at least one training seismic risk value associated with the first location;
  deriving a process model relating the plurality of training input parameters to the at least one training seismic risk value by determining influence values of the training input parameters;
  receiving a plurality of working input parameters associated with a second location of an injection well, the working input parameters including fluid injection information at the injection well and at least one of true injection depth information, true formation information, permeability information, three-dimensional fault map information, and seismic activity information; and
  applying the process model to the plurality of working input parameters to determine a seismic risk value at the second location of the injection well.

30. A non-transitory computer readable storage medium for determining seismic risk associated with fluid disposal, the storage medium configured to store a computer application for execution by at least one processor, wherein the computer application causes the at least one processor to carry out processing steps comprising:
  receiving a plurality of training input parameters associated with a first location, the training input parameters including at least one of true injection depth information, true formation information, permeability information, three-dimensional fault map information, fluid injection information, and seismic activity information;
  receiving at least one training seismic risk value associated with the first location;
  deriving a process model relating the plurality of training input parameters to the at least one training seismic risk value by determining influence values of the training input parameters;
  receiving a plurality of working input parameters associated with a second location of an injection well, the working input parameters including fluid injection information at the injection well and at least one of true injection depth information, true formation information, permeability information, three-dimensional fault map information, and seismic activity information; and
  applying the process model to the plurality of working input parameters to determine a seismic risk value at the second location of the injection well.

* * * * *